(12) United States Patent
Suemitsu et al.

(10) Patent No.: US 11,274,062 B2
(45) Date of Patent: Mar. 15, 2022

(54) RADIATIVE COOLING DEVICE

(71) Applicant: Osaka Gas Co., Ltd., Osaka (JP)

(72) Inventors: Masahiro Suemitsu, Osaka (JP); Tadashi Saito, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 28 days.

(21) Appl. No.: 17/041,059

(22) PCT Filed: Jul. 17, 2019

(86) PCT No.: PCT/JP2019/028145
§ 371 (c)(1),
(2) Date: Sep. 24, 2020

(87) PCT Pub. No.: WO2020/022156
PCT Pub. Date: Jan. 30, 2020

(65) Prior Publication Data
US 2021/0024409 A1    Jan. 28, 2021

(30) Foreign Application Priority Data
Jul. 23, 2018  (JP) .............................. JP2018-137746

(51) Int. Cl.
*B32B 17/06* (2006.01)
*C03C 17/36* (2006.01)
*F28F 21/06* (2006.01)

(52) U.S. Cl.
CPC ........ *C03C 17/366* (2013.01); *C03C 17/3613* (2013.01); *C03C 17/3626* (2013.01);
(Continued)

(58) Field of Classification Search
CPC ............ C03C 17/3613; C03C 17/3644; C03C 17/3649; C03C 2217/256; C03C 17/366
(Continued)

(56) References Cited

U.S. PATENT DOCUMENTS 5,513,040 A    4/1996  Yang
6,531,230 B1   3/2003  Weber et al.
(Continued)

FOREIGN PATENT DOCUMENTS

CN    103794665 A   †   5/2014
CN    104459848 A   †   3/2015
(Continued)

*Primary Examiner* — Lauren R Colgan
(74) *Attorney, Agent, or Firm* — The Webb Law Firm

(57) ABSTRACT

Provided is a radiative cooling device that provides coloration of the radiative surface while maximally avoiding reduction in its radiative cooling performance due to absorption of solar light. An infrared radiative layer for radiating infrared light from a radiative surface and a light reflective layer disposed on the side opposite to the presence side of the radiative surface of the infrared radiative layer are provided in a mutually stacked state. The light reflective layer is arranged such that a first metal layer made of silver or silver alloy and having a thickness equal to or greater than 10 nm and equal to or less than 100 nm, a transparent dielectric layer and a second metal layer reflecting light transmitted through the first metal layer and the transparent dielectric layer are stacked in this order on the side closer to the infrared radiative layer. The transparent dielectric layer has a thickness that causes a resonance wavelength of the light reflective layer to be a wavelength included in wavelengths equal to or greater than 400 nm and equal to or less than 800 nm.

11 Claims, 16 Drawing Sheets

(52) U.S. Cl.
CPC ...... *C03C 17/3644* (2013.01); *C03C 17/3649* (2013.01); *F28F 21/065* (2013.01); *C03C 2217/214* (2013.01); *C03C 2217/252* (2013.01); *C03C 2217/256* (2013.01); *C03C 2217/281* (2013.01); *C03C 2218/154* (2013.01); *F28F 2245/06* (2013.01)

(58) Field of Classification Search
USPC .................................... 428/336, 432, 434
See application file for complete search history.

(56) References Cited

U.S. PATENT DOCUMENTS

| | | | |
|---|---|---|---|
| 6,587,263 B1* | 7/2003 | Iacovangelo | G02B 1/12 359/359 |
| 10,126,020 B2† | 11/2018 | Villuendas Yuste et al. | |
| 2004/0032658 A1 | 2/2004 | Fleming | |
| 2009/0195865 A1† | 8/2009 | Kleideiter | |
| 2011/0261443 A1 | 10/2011 | Isojima et al. | |
| 2013/0057951 A1* | 3/2013 | Hevesi | G02B 5/0858 359/359 |
| 2015/0338175 A1* | 11/2015 | Raman | F28F 13/18 165/185 |
| 2016/0002100 A1* | 1/2016 | Melcher | C03C 17/3649 428/216 |
| 2016/0003989 A1* | 1/2016 | Watanabe | G02B 5/26 359/359 |
| 2020/0240725 A1* | 7/2020 | Suemitsu | G02B 5/283 |
| 2020/0398531 A1* | 12/2020 | Suemitsu | G02B 5/26 |
| 2020/0400391 A1* | 12/2020 | Suemitsu | B32B 17/061 |
| 2021/0024409 A1* | 1/2021 | Suemitsu | G02B 5/08 |

FOREIGN PATENT DOCUMENTS

| | | |
|---|---|---|
| JP | 2696877 B2 | 9/1997 |
| JP | H10508263 A | 8/1998 |
| JP | H10291839 A | 11/1998 |
| JP | 2002509271 A | 3/2002 |
| JP | 2005535983 A | 11/2005 |
| JP | 201131601 A | 2/2011 |
| JP | 2013532306 A | 8/2013 |
| JP | 2016513056 A | 5/2016 |
| WO | 2016/205717 A1 † | 12/2016 |
| WO | 2017/151514 A1 † | 9/2017 |
| WO | 2018180177 A1 | 10/2018 |
| WO | 2019163340 A1 | 8/2019 |

\* cited by examiner
† cited by third party

| arrangement No | TEMPAX (mm) | Al$_2$O$_3$ (nm) | Ag (nm) | Si$_3$N$_4$ (nm) | SiO$_2$ (nm) | Ag (nm) | Al (nm) | Cu (nm) | Au (nm) | color | XY chromaticity (at time of D65 light illumination) (x, y) |
|---|---|---|---|---|---|---|---|---|---|---|---|
| 1 | 1.0 | 5 | 35 | 100 | – | 100 | – | – |  | pale blue | (0.285, 0.330) |
| 2 | 1.0 | 5 | 35 | 80 | – | 100 | – | – |  | pink | (0.317, 0.294) |
| 3 | 1.0 | 5 | 35 | 65 | – | 100 | – | – |  | red | (0.332, 0.342) |
| 4 | 1.0 | 5 | 35 | 50 | – | 100 | – | – |  | yellow | (0.332, 0.364) |
| 5 | 1.0 | 5 | 35 | 100 | – | – | 30 | – |  | blue | (0.269, 0.283) |
| 6 | 1.0 | 5 | 35 | 100 | – | 10 | 60 | – |  | blue | (0.263, 0.310) |
| 7 | 1.0 | 5 | 30 | 90 | – | – | 30 | – |  | pink | (0.315, 0.244) |
| 8 | 1.0 | 5 | 55 | 90 | – | – | – | 100 |  | pale blue | (0.302, 0.329) |
| 9 | 1.0 | 5 | 55 | 90 | – | – | – | – | 100 | pale blue | (0.303, 0.331) |
| 10 | 1.0 | 5 | 35 | – | 100 | 100 | – | – |  | yellow | (0.340, 0.373) |
| 11 | 1.0 | 5 | 35 | 50 | 70 | 100 | – | – |  | pale blue | (0.284, 0.321) |

| resonance wavelength | color (at time of D65 light illumination) |
|---|---|
| 400 | pale yellow |
| 450 | dark yellow |
| 500 | orange |
| 550 | pink |
| 600 | pale blue |
| 650 | yellow-green |
| 700 | white |
| 750 | white |
| 800 | pale yellow※ |

RADIATIVE COOLING DEVICE

CROSS-REFERENCE TO RELATED APPLICATIONS

This application is the United States national phase of International Application No. PCT/JP2019/028145 filed Jul. 17, 2019, and claims priority to Japanese Patent Application No. 2018-137746 filed Jul. 23, 2018, the disclosures of which are hereby incorporated by reference in their entirety.

TECHNICAL FIELD

The present invention relates to a radiative cooling device configured such that an infrared radiative layer for radiating infrared light from a radiative surface and a light reflective layer disposed on the side opposite to the presence side of the radiative surface of the infrared radiative layer are provided in a mutually stacked state.

BACKGROUND ART

Such radiative cooling device is provided for use in cooling various kinds of cooling targets or objects, with an arrangement e.g. that infrared light (radiation) radiated from the radiative surface of the infrared radiative layer is transmitted through the atmospheric window (e.g. a range of wavelength that allows good transmission therethrough of infrared light having wavelengths ranging from 8 μm to 14 μm), thereby to cool a cooling target (a target or an object to be cooled) located on the side of the light reflective layer opposite to the presence side of the infrared radiative layer.

By the way, the light reflective layer reflects the light (visible light, ultraviolet light, infrared light) transmitted through the infrared radiative layer from the radiative surface, thus preventing such light (visible light, ultraviolet light, infrared light) transmitted through the infrared radiative layer from being projected onto the cooling target to heat this cooling target.

Incidentally, the light reflective layer has a further function of reflecting not only the light transmitted through the infrared radiative layer, but also the infrared light radiated from the infrared radiative layer to the presence side of the light reflective layer back toward the infrared radiative layer. However, the following explanation will be made on a premise that the light reflective layer is provided for the purpose of reflecting the light (visible light, ultraviolet light, infrared light) transmitted through the infrared radiative layer.

As a first conventional example of such radiative cooling device, there are known one configured such that the infrared radiative layer is comprises a laminar body consisting of a layer of $SiO_2$, a layer of MgO or glass (optical glass) and the light reflective layer comprises a diffusive reflective body or a multi-layered body comprised of a multiple layers of a metal layer formed of silver, a layer of $TiO_2$ and a layer of $SiO_2$ disposed in alternation (see e.g. Patent Document 1).

BACKGROUND ART DOCUMENT

Patent Document

Patent Document 1: detailed disclosure of U.S. Patent Application Publication No. 2015/0338175

SUMMARY OF THE INVENTION

Problem to be Solved by Invention

The radiative cooling device is to be configured such that its reflectance under the condition of the infrared radiative layer and the light reflective layer being stacked provides a high reflectance for the wavelength range (e.g. wavelength equal to or higher than 400 nm and equal to or less than 1800 nm, see FIG. 26) where the intensity of the solar light energy is high.

Namely, while the infrared radiative layer has a high transmittance for the wavelength range where the solar light energy is high, the light reflective layer is provided with a high reflectance to reflect sufficiently the light transmitted through the infrared radiative layer.

The wavelength range where the solar light energy is high includes the range of visible light (equal to or greater than 400 nm and equal to or less than 1800 nm). However as a result of the arrangement of the light reflective layer reflecting the visible light range with a high reflectance, when the radiative cooling device is seen from the presence side of the radiative surface of the infrared radiative layer, coloring condition is not felt as e.g. a condition similar to that of a mirror surface is felt instead.

Namely, the present inventors previously conducted research for and developed a radiative cooling device configured such that the infrared radiative layer comprises a glass (white plate glass) selected from the group consisting of alkali free glass, crown glass and borosilicate glass and the light reflective layer comprises a metal layer formed of silver having a thickness equal to or greater than 300 nm, so that as the light transmitted through the infrared radiative layer is reflected appropriately by the light reflective layer, thus cooling a cooling target appropriately. However, with this radiative cooling device, when the radiative cooling device is viewed from the presence side of the radiative surface of the infrared radiative layer, its back face is felt like a condition similar to that of a silver-colored mirror face, no coloring effect being felt.

However, for the sake of improvement of the aesthetic effect, it was desired that coloring of blue, pink, etc. should be felt or present when the radiative cooling device is viewed from the presence side of the radiative surface of the infrared radiative layer.

More particularly, the radiative cooling device is intended or assumed to be used for installation in a roof of a house, a roof of an automobile, etc. In such case, in order to allow the radiative cooling device as viewed from the presence side of the radiative surface of the infrared radiative layer to exhibit a color which harmonizes with the color of the surrounding, it may be desired that coloration effect can be felt appropriately when the radiative cooling device as viewed from the presence side of the radiative surface of the infrared radiative layer.

Incidentally, in the following description, a condition of coloration effect felt when the radiative cooling device is viewed from the presence side of the radiative surface of the infrared radiative layer will be referred in short as a "condition of coloration of the radiative surface".

The present invention has been made in view of the above-described state of the art and its object is provide a radiative cooling device that provides coloration of the radiative surface while maximally avoiding reduction in its radiative cooling performance due to absorption of solar light.

Solution

A radiative cooling device according to the present invention configured such that an infrared radiative layer for radiating infrared light from a radiative surface and a light reflective layer disposed on the side opposite to the presence side of the radiative surface of the infrared radiative layer are provided in a mutually stacked state, the radiative cooling device being characterized in that:

the light reflective layer is arranged such that a first metal layer made of silver or silver alloy and having a thickness equal to or greater than 10 nm and equal to or less than 100 nm, a transparent dielectric layer and a second metal layer for reflecting light transmitted through the first metal layer and the transparent dielectric layer are stacked in this order on the side closer to the infrared radiative layer; and the transparent dielectric layer has a thickness that causes a resonance wavelength of the light reflective layer to be a wavelength included in wavelengths equal to or greater than 400 nm and equal to or less than 800 nm.

Namely, as the thickness of the first metal layer formed of silver or silver alloy is set to a range equal to or greater than 10 nm and equal to or less than 100 nm, it is possible to allow the visible light to be transmitted appropriately while implementing optical control (resonance of the resonance wavelength) appropriately.

That is, with silver or silver alloy, the thinner, the higher the transmittance for solar light transmission. In contrast, the reflectance thereof decreases. Therefore, if the thickness of the first metal layer is set to be greater than 100 nm, it will become unable to appropriately transmit the visible light transmitted through the infrared radiant layer, so that coloration of the radiative surface through absorption of light utilizing resonance of the resonance wavelength becomes impossible. On the other hand, if the thickness of the first metal layer is set to be smaller than 10 nm, appropriate reflection of light becomes impossible, so that appropriate optical control (resonance of the resonance wavelength) will become impossible. As a result, coloration of the radiative surface by light absorption utilizing resonance of the resonance wavelength becomes impossible.

And, the visible light transmitted through the first metal layer will basically be transmitted through the transparent dielectric layer and then reflected by the second metal layer to be emitted again from the radiant surface of the infrared radiation layer into the atmosphere. In this, since the thickness of the transparent dielectric layer is configured as a thickness that causes a resonance wavelength of the light reflective layer to be a wavelength included in the wavelengths equal to or greater than 400 nm and equal to or less than 800 nm, the light of the narrow band range centering about whichever resonance wavelength of the visible light transmitted through the first metal layer (i.e. the light having a wavelength equal to or greater than 400 nm and equal to or less than 800 nm) will be absorbed by the light reflective layer by the optical control arrangement (resonance of the resonance wavelength).

That is, the light of the narrow band range centering about the resonance wavelength included in the visible light transmitted through the first metal layer to reach the transparent dielectric layer will be reflected back and forth in repetition between the first metal layer and the second metal layer and will be absorbed by the first metal layer and/or the second metal layer in the course of this process.

As a result, the visible light reflected by the light reflective layer and emitted from the radiative surface of the infrared radiant layer into the atmosphere will not include the light of the narrow band range absorbed by the light reflective layer. Thus, when the radiative cooling device is viewed from the presence side of the radiative surface of the infrared radiative layer, a coloration condition (effect) will be felt and present.

And, by changing the thickness of the transparent dielectric layer thereby to change the wavelength used as the resonance wavelength included in the wavelengths equal to or greater than 400 nm and equal to or less than 800 nm, the color exhibited by the radiative cooling device when viewed from the presence side of the radiative surface of the infrared radiative layer can be changed (see FIG. 27).

Moreover, since the light of the narrow band range centering about the resonance wavelength of the visible light (namely, the light having wavelengths equal to or greater than 400 nm and equal to or less than 800 nm) is absorbed by the light reflective layer, even though there occurs certain reduction in the radiative cooling performance due to rise of temperature resulting from solar light absorption, since this is absorption of light of narrow band range, the resultant reduction in the radiative cooling performance will be small.

In short, according to the characterizing feature of the present invention, it is possible to provide a radiative cooling device that provides coloration (effect) of the radiative surface while maximally avoiding reduction in its radiative cooling performance due to absorption of solar light.

According to a further characterizing feature of the radiative cooling device of the present invention, the second metal layer is formed of silver or silver alloy having a thickness equal to or greater than 100 nm.

Namely, with silver or silver alloy, the greater its thickness (membrane thickness), the greater its reflectance. In particular, if the thickness exceeds 100 nm, the reflectance for the infrared light or visible light (wavelengths equal to or greater than 400 nm and equal to or less than 800 nm) increases to such a degree to exceed 90%.

Therefore, since the thickness of the second metal layer formed of silver or silver alloy is set equal to or greater than 100 nm, by appropriately reflecting the infrared light and/or visible light transmitted through the first metal layer and the transparent dielectric layer, it is possible to prevent the infrared light and/or visible light from reaching a cooling target positioned on the side of the light reflective layer opposite to the presence side of the infrared radiative layer, whereby cooling of the cooling target may be carried out appropriately.

In short, according to the further characterizing feature of the present invention, cooling of the cooling target can be carried out appropriately by appropriately reflecting the infrared light and/or visible light by the second metal layer.

According to a still further characterizing feature of the radiative cooling device of the present invention, the second metal layer is formed of aluminum or aluminum alloy having a thickness equal to or greater than 30 nm.

Namely, aluminum or aluminum alloy has a higher absorbance for the visible light than silver or silver alloy (see FIG. 31).

Therefore, by forming the second metal layer of aluminum or aluminum alloy having a thickness equal to or greater than 30 nm, the light having the resonance wavelength and included in the visible light transmitted through the first metal layer to eventually reach the transparent dielectric layer can be absorbed by the second metal layer appropriately. Thus, in comparison with an arrangement of forming the second metal layer of silver or silver alloy, more distinct coloration effect can be obtained.

Incidentally, aluminum or aluminum alloy has a higher reflectance for the ultraviolet light than silver or silver alloy.

Thus, it can appropriately reflect ultraviolet light transmitted through the first metal layer, so that the ultraviolet light can be reliably prevented from reaching the cooling target located on the side of the light reflective layer opposite to the presence side of the infrared radiative layer, whereby the cooling of the cooling target can be carried out appropriately.

In short, according to the still further characterizing feature of the present invention, more distinct coloration effect can be obtained.

According to a still further characterizing feature of the radiative cooling device of the present invention, the second metal layer comprises the first layer formed of silver or silver alloy and the second layer formed of aluminum or aluminum alloy stacked and disposed in this order to the side closer to the transparent dielectric layer.

Namely, in case the first layer formed of silver or silver alloy and the second layer formed of aluminum or aluminum alloy are stacked with the first layer being located on the side close to the transparent dielectric layer, while the thickness (membrane thickness) of the first layer is reduced than the case of forming the second metal layer of silver or silver alloy, it is still possible to obtain an optical characteristics almost same as the case of forming the second metal layer of silver or silver alloy. Thus, it becomes possible to reduce the amount of expensive silver or silver alloy to be used.

Moreover, by decreasing the general thickness to 60 nm approximately while making the thickness of the first layer greater than 2 nm and making the thickness of the second layer equal to or greater than 30 nm, it is possible e.g. to form a second metal layer having almost same optical characteristics as the case of forming the second metal layer entirely of silver or silver alloy. Thus, the membrane thickness of the second metal layer can be smaller than the thickness (e.g. 100 nm) in the case of forming the second metal layer entirely of silver or silver alloy. Thus, manufacture cost reduction of the second metal layer is made possible.

In short, according to the still further characterizing feature of the radiative cooling device of the present invention, the cost reduction of the second metal layer is made possible through manufacture cost reduction through reduction in the amount of use of the expensive silver or silver alloy.

According to a still further characterizing feature of the radiative cooling device of the present invention, the transparent dielectric layer comprises a transparent nitride membrane.

Namely, by providing a transparent nitride membrane as the transparent dielectric layer and adjusting its thickness, adjusting of the color under the colored condition of the radiative surface can be carried out favorably.

As some specific examples of such transparent nitride membrane, $Si_3N_4$ and AlN can be cited. The transparent nitride membrane, when formed into a membrane by such technique as sputtering, vapor deposition, etc., does not cause discoloration of silver or silver alloy in case the first metal layer is formed of silver or silver alloy, thus being advantageous in facilitating productivity improvement.

Incidentally, the transparent nitride layer, in case the first metal layer is formed of silver or silver alloy and the second metal layer is formed of aluminum or aluminum alloy, acts as a transparent anti-alloying layer for preventing alloying between silver or silver alloy of the first meal layer and aluminum or aluminum alloy of the second metal layer.

Namely, with suppression of alloying between silver and aluminum, with effective avoidance of light absorbance by the light reflective layer, the condition of appropriately reflecting light by the light reflective layer can be maintained for a long period of time.

In short, according to the still further characterizing feature of the radiant cooling device of the present invention, color adjustment under the colored condition of the radiative surface can be carried out favorably.

According to a still further characterizing feature of the radiative cooling device of the present invention, the transparent dielectric layer comprises a transparent oxide layer.

Namely, by providing a transparent oxide membrane as the transparent dielectric layer and adjusting its thickness, adjusting of the color under the colored condition of the radiative surface can be carried out favorably.

As some specific examples of such transparent oxide membrane, many kinds can be used, but, $Al_2O_3$, $SiO_2$, $TiO_2$, $ZrO_2$, $HfO_2$, $Nb_2O_5$, $Ta_2O_5$, which can be readily formed into membrane by the vapor deposition, the sputtering technique etc., can be cited.

Incidentally, the transparent oxide layer, in case the first metal layer is formed of silver or silver alloy and the second metal layer is formed of aluminum or aluminum alloy, acts as a transparent anti-alloying layer for preventing alloying between silver or silver alloy of the first metal layer and aluminum or aluminum alloy of the second metal layer.

Namely, with suppression of alloying between silver and aluminum, with effective avoidance of light absorbance by the light reflective layer, the condition of appropriately reflecting light by the light reflective layer can be maintained for a long period of time.

In short, according to the still further characterizing feature of the radiant cooling device of the present invention, color adjustment under the colored condition of the radiative surface can be carried out favorably.

According to a still further characterizing feature of the radiative cooling device of the present invention, the infrared radiative layer comprises glass selected from the group consisting of alkali free glass, crown glass and borosilicate glass.

Namely, alkali free glass, crown glass and borosilicate glass are relatively inexpensive, yet having high transmittance for the wavelength equal to or greater than 400 nm and equal to or less than 1800 nm where the intensity of the solar light energy is high (e.g. equal to or greater than 95%) and have a characteristics of high emission intensity for radiating infrared light having wavelengths corresponding to the atmospheric window (e.g. window that transmits infrared light having wavelength equal to or greater than 8 μm and equal to or less than 14 μm).

Therefore, by constituting the infrared radiative layer of any glass selected from the group consisting of alkali free glass, crown glass and borosilicate glass, it is possible to obtain a radiative cooling device having high cooling capacity while achieving cost reduction in the general arrangement.

In short, according to the still further characterizing feature of the radiative cooling device of the present invention, it is possible to obtain improvement in the cooling capacity while achieving cost reduction in the general arrangement.

According to a still further characterizing feature of the radiative cooling device of the present invention, the infrared radiative layer is used as a substrate, on which the first metal layer, the transparent dielectric layer and the second metal layer are stacked.

Namely, since the infrared radiative layer is used as a substrate and the first metal layer, the transparent dielectric layer and the second metal layer are stacked on this substrate, it is possible to achieve thickness reduction of the general arrangement while achieving simplification of the general arrangement.

Incidentally, in case the first metal layer, the transparent dielectric layer and the second metal layer are to be stacked on the infrared radiative layer as a substrate, if the first metal layer, the transparent dielectric layer and the second metal layer are thin, the first metal layer, the transparent dielectric layer and the second metal layer will be stacked one after another by the sputtering technique or the like.

Namely, in comparison with an arrangement in which a substrate for stacking is provided separately and on this stacking substrate, the second metal layer, the transparent dielectric layer and the first metal layer are stacked one after another by e.g. the sputtering technique or the like, after which at the portion of the first metal layer on the side opposite to the presence side of the second metal layer, an infrared radiative layer separately fabricated will be placed to be stacked thereon or in which the infrared radiative layer is stacked by the sputtering technique or the like at the portion of the first metal layer on the side opposite to the presence side of the transparent dielectric layer, there is no need to provide a stacking substrate. Consequently, it is possible to achieve simplification of the general arrangement and also to achieve membrane thickness reduction of the general arrangement.

In short, according to the still further characterizing feature of the radiative cooling device of the present invention, simplification of the general arrangement can be achieved and moreover reduction of the membrane thickness of the general arrangement can be achieved also.

According to a still further characterizing feature of the radiative cooling device of the present invention, a gapless contact layer is stacked between the infrared radiative layer and the first metal layer.

Namely, since a gapless contact layer is stacked between the infrared radiative layer and the first metal layer, it is possible to suppress occurrence of damage such as peeling-off of the first metal layer of the light reflective layer from the infrared radiative layer formed of glass, etc. due to e.g. temperature change, etc. Thus, durability can be improved.

In short, according to the still further characterizing feature of the radiative cooling device of the present invention, durability can be improved.

According to a still further characterizing feature of the radiative cooling device of the present invention, on the side of the second metal layer opposite to the presence side of the transparent dielectric layer, an anti-oxidization layer is stacked.

Namely, on the side of the second metal opposite to the presence side of the transparent dielectric layer, an anti-oxidization layer is stacked. Therefore, oxidization deterioration of the second metal layer can be suppressed, so that the durability can be improved.

In short, according to the still further characterizing feature of the radiative cooling device of the present invention, deterioration of the second metal layer can be suppressed, whereby the durability can be improved.

According to a still further characterizing feature of the radiative cooling device of the present invention, the radiative surface of the infrared radiative layer has unevenness for light diffusion.

Namely, since the radiative surface of the infrared radiative layer has unevenness for light diffusion, the colored condition of the radiative surface of the infrared radiative layer, namely, the colored condition of the radiative cooling device as viewed from the presence side of the radiative surface of the infrared radiative layer, can be appropriately obtained even when the radiative surface is viewed from various directions.

In short, according to the still further characterizing feature of the radiative cooling device of the present invention, the colored condition of the radiative surface can be appropriately obtained even when the radiative surface is viewed from various directions.

EMBODIMENTS

Next, an embodiment of the present invention will be explained with reference to the accompanying drawings.

[Basic Arrangement of Radiative Cooling Device]

Figure 1:
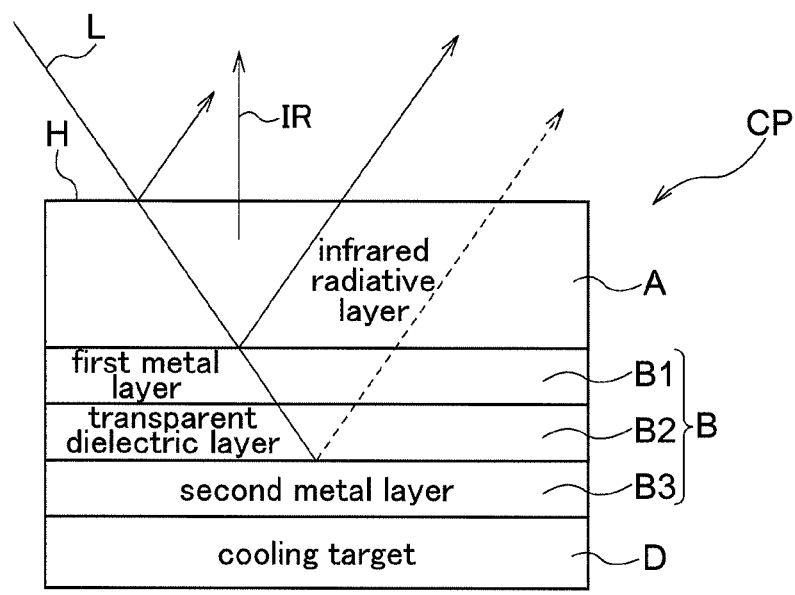
FIG. 1 is a view showing a basic arrangement of a radiative cooling device.

As shown in FIG. 1, a basic arrangement of a radiative cooling device CP is an arrangement in which an infrared radiative layer A for radiating infrared light (infrared radiation) IR from a radiative surface H thereof and a light reflective layer B disposed on the side opposite to the presence side of the radiative surface H of the infrared radiative layer A are disposed in a mutually stacked state.

The light reflective layer B is configured such that a first metal layer B1, a transparent dielectric layer B2 and a second metal layer B3 are stacked, with the first metal layer B1, the transparent dielectric layer B2 and the second metal layer B3 for reflecting light transmitted through the first metal layer B1 and the transparent dielectric layer B2 being positioned in this order on the side closer to the infrared radiative layer A.

And, the thickness of the transparent dielectric layer B2 is set to a thickness (equal to or greater than 30 nm and equal to or less than 230 nm) for rendering the resonance wavelength of the light reflective layer B to a wavelength included in the wavelengths equal to or greater than 400 nm and equal to or less than 800 nm.

Figure 26:
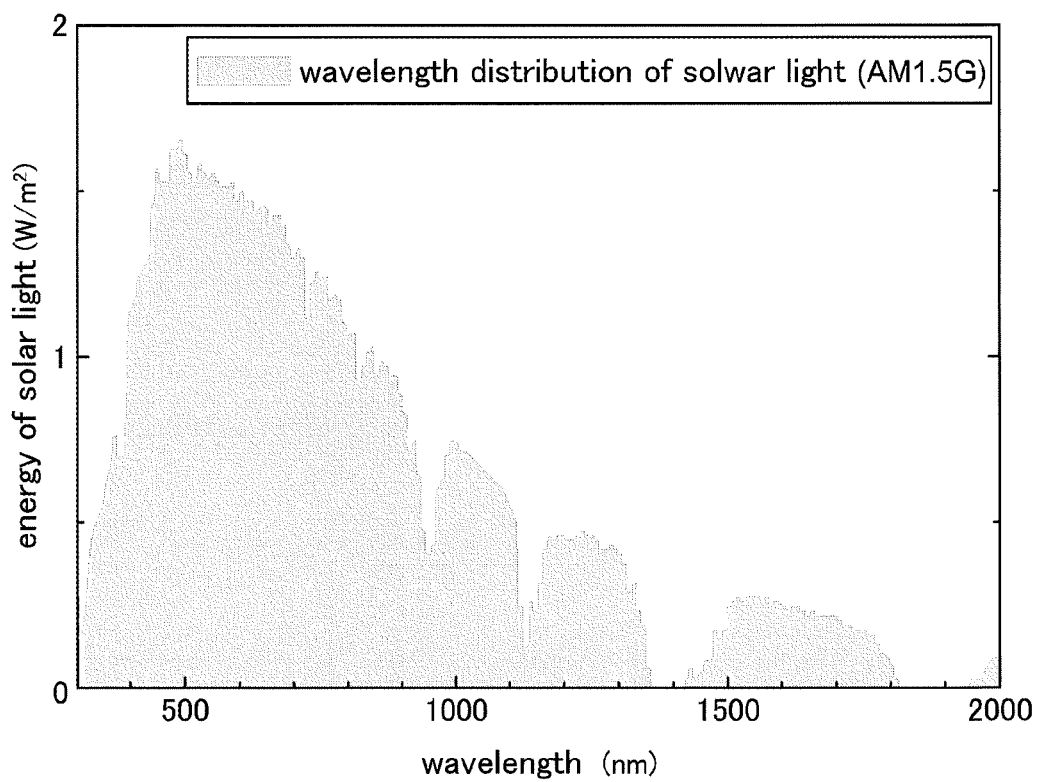
FIG. 26 is a graph showing intensity of solar light energy.

Advantageously, the infrared radiative layer A is formed of such material that provides high transmittance (e.g. equal to or greater than 95%) for the wavelength range (see FIG. 26) equal to or greater than 400 nm and equal to or less than 800 nm where the intensity of the solar light energy is high and generates large heat radiation in the wavelength range equal to or greater than 8 μm and equal to or less than 14 μm.

As a specific example thereof, glass (white plate glass) of any one of alkali free glass, crown glass and borosilicate glass can be cited. As other examples, resins such as olefin resin, PET-based resin, fluorine-based resin, silicone-based resin, acryl-based resin, vinyl chloride-based resin, vinylidene chloride-based resin, etc. can be cited.

Incidentally, as alkali free glass, it is possible to employ e.g. OA10G (manufactured by Nippon Electric Glass Co., Ltd.). As crown glass, it is possible to employ e.g. B270 (registered trademark, same as below). As borosilicate glass, it is possible to employ e.g. TEMPAX (registered trademark, same as below).

In the following description, explanation will be made on a premise of the infrared radiative layer A being formed of "TEMPAX".

Incidentally, thickness of TEMPAX constituting the infrared radiative layer A needs to be equal to or greater than 10 μm and equal to or less than 10 cm, preferably equal to or greater than 20 μm and equal to or less than 10 cm, more preferably, equal to or greater than 100 μm and equal to or less than 1 cm.

Namely, by configuring the infrared radiative layer A to exhibit high heat emissivity in the infrared range having wavelength equal to or greater than 8 μm and equal to or less than 14 μm, which heat emissivity is greater than those of AM1.5G solar light and the atmosphere which are absorbed by the infrared radiative layer A and the light reflective layer B respectively, it is possible to configure a radiative cooling device CP capable of achieving radiative heat cooling function providing temperature reduction relative to the surrounding atmosphere day and night.

And, to the above-described end, in case the infrared radiative layer A is formed of TEMPAX, its thickness needs to be equal to or greater than 10 μm and equal to or less than 10 cm, preferably equal to or greater than 20 μm and equal to or less than 10 cm, even more preferably equal to or greater than 100 μm and equal to or less than 1 cm.

In the instant embodiment, it is assumed that the thickness of TEMPAX is 1 mm.

The first metal layer B1 is formed of silver or silver alloy having a thickness within the range equal to or greater than 10 nm and equal to or less than 100 nm.

As the "silver alloy", it is possible to employ an alloy made of silver added with any one or more of copper, palladium, gold, zinc, tin, magnesium, nickel, titanium by a ratio from 0.4 to 4.5 mass % approximately. As a specific example, it is possible to employ "APC-TR" (manufactured by Furuya Metal Co., Ltd.), which is a silver alloy prepared by adding copper and palladium to silver.

Incidentally, in the following description, explanation will be made on a premise of using silver to constitute the first metal layer B1.

By the way, FIG. 3, FIG. 5, FIG. 7, FIG. 9, FIG. 13 and FIG. 15 show specific examples (specific arrangements) of the radiative cooling device CP. In all of these specific examples, the thickness of the first metal layer B1 is 35 nm.

Incidentally, in the following description, the specific examples (specific arrangements) of the radiative cooling device CP shown in FIG. 3, FIG. 5, FIG. 7, FIG. 9, FIG. 13 and FIG. 15 will be referred to as the first through sixth arrangements, respectively.

Figure 22:
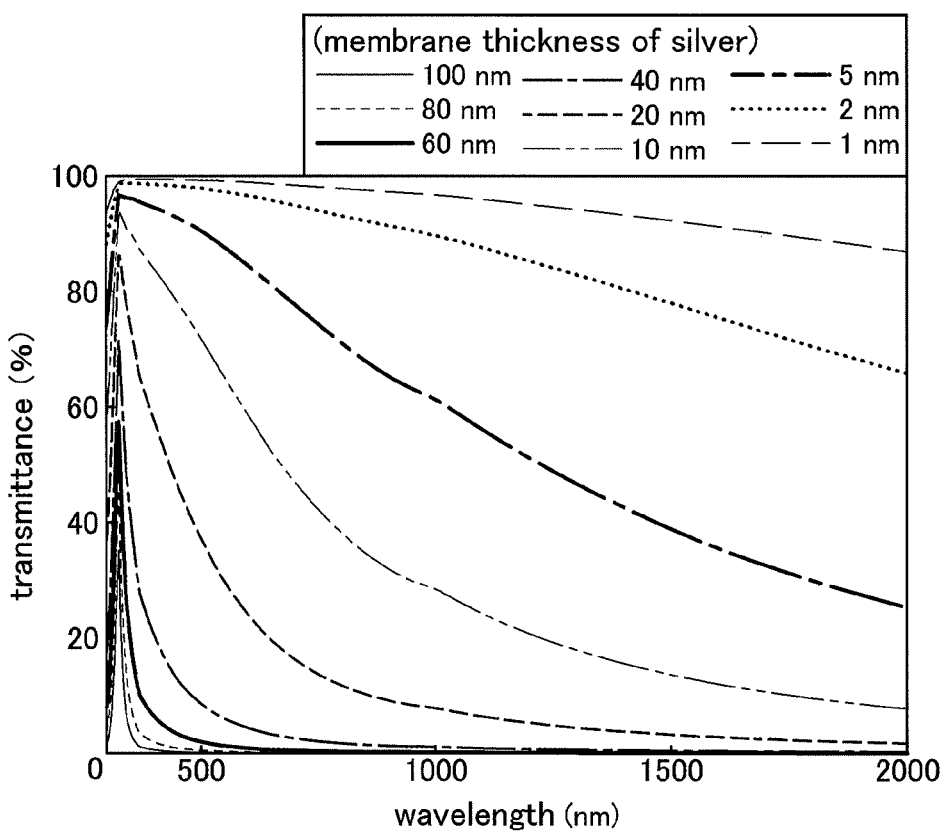
FIG. 22 is a view showing relation between membrane thickness of silver and transmittance.
Figure 23:
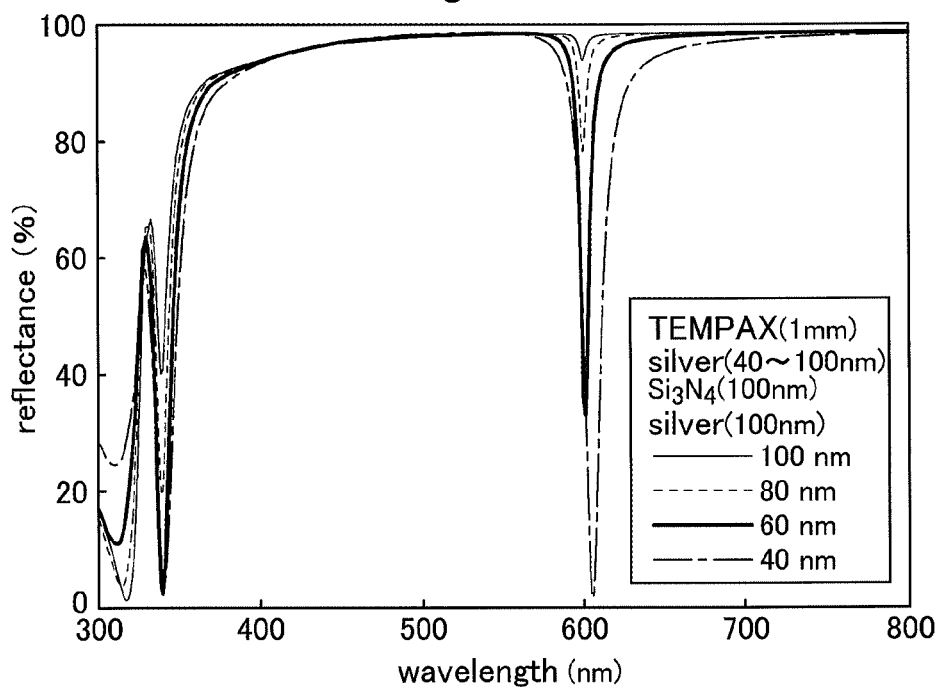
FIG. 23 is a view showing relation between thickness of first metal layer and reflectance of light reflective layer.
Figure 24:
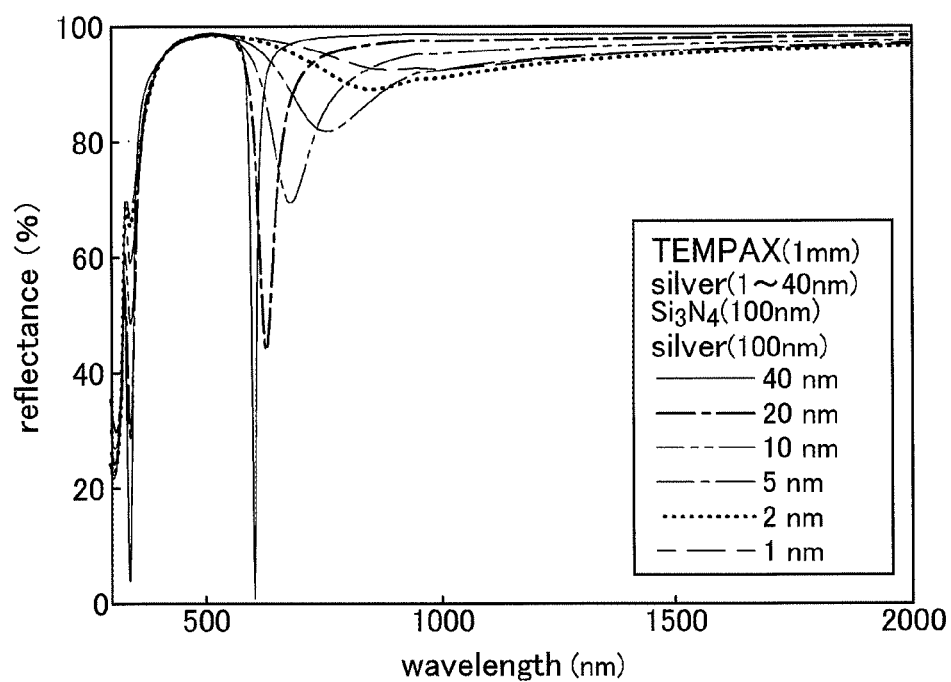
FIG. 24 is a view showing relation between thickness of first metal layer and reflectance of light reflective layer.

Further, with the silver of the first metal layer B1, as shown in FIG. 22, the transmittance thereof changes with change of its thickness. As a result, as shown in FIG. 23 and FIG. 24, in correspondence with the change of the thickness of the silver of the first metal layer B1, the reflectance of the radiative cooling device CP (light reflective layer B) changes. The details of this will be described later.

As the second metal layer B3, as shown in the first through fourth arrangements, there are cases of constituting it of silver or silver alloy (see FIG. 3, FIG. 5, FIG. 7, FIG. 9), cases of constituting it of aluminum or aluminum alloy (see FIG. 13) as shown in the fifth arrangement, and, as shown in the sixth arrangements, a case (see FIG. 15) in which a first layer b1 and a second layer b2 are stacked, with the first layer b1 formed of silver or silver alloy and the second layer b2 formed of aluminum or aluminum alloy being disposed in this order to the side closer to the transparent dielectric layer B2. And, there are other cases not shown in which it is constituted of using copper or gold.

In the case of constituting the second metal layer B3 of silver or silver alloy, the thickness thereof is preferably equal to or greater than 80 nm, more preferably, equal to or greater than 100 nm.

In the case of constituting the second metal layer B3 of aluminum or aluminum alloy, the thickness thereof is preferably equal to or greater than 30 nm, more preferably, equal to or greater than 50 nm.

In the case of constituting the second metal layer B3 of copper, the thickness thereof is preferably equal to or greater than 80 nm, more preferably, equal to or greater than 100 nm.

In the case of constituting the second metal layer B3 of gold, the arrangement may be similar to that of copper.

In the case of constituting the second metal layer B3 of the first layer b1 and the second layer b2 stacked on each other, by setting the thickness (membrane thickness) of the first layer b1 greater than 2 nm and setting the thickness (membrane thickness) of the second layer b2 equal to or greater than 30 nm and also setting the entire (combined) thickness to about 60 nm, it is possible to provide substantially same optical property as the case of constituting the second metal layer B3 entirely of silver or silver alloy in the thickness of 100 nm approximately.

Figure 15:
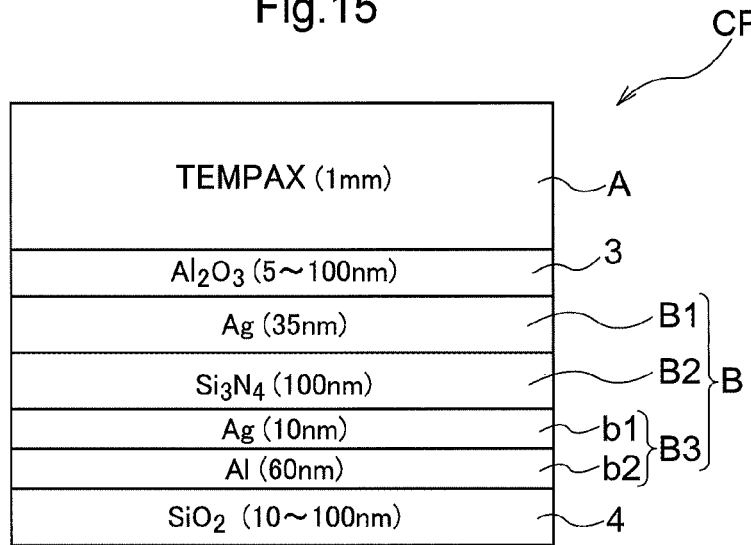
FIG. 15 is a view showing a sixth arrangement of the radiative cooling device.

Incidentally, FIG. 15 illustrates a case in which the first layer b1 is silver having thickness of 10 nm and the second layer b2 is aluminum having thickness of 60 nm.

By the way, as shown in the sixth arrangement, in the case which the second metal layer B3 is constituted of a first layer b1 formed of silver or silver alloy and a second layer b2 formed of aluminum or aluminum alloy, through not shown, advantageously, a transparent nitride membrane or a transparent oxide membrane similar to the transparent dielectric layer B2 may be stuck, as a transparent anti-alloying layer, between the first layer b1 and the second layer b2.

As the "aluminum alloy", it is possible to employ an alloy made of aluminum added with any one or more of copper, manganese, silicon, magnesium, zinc, carbon steel for machine structure, yttrium, lanthanum, gadolinium, terbium.

The transparent dielectric layer B2 is constituted as a transparent nitride membrane or a transparent oxide membrane.

As examples of the transparent nitride membrane, $Si_3N_4$, AlN can be cited.

As examples of the transparent oxide membrane, many kinds of oxides can be cited, but $Al_2O_3$, $SiO_2$, $TiO_2$, $ZrO_2$, $HfO_2$, $Nb_2O_5$, $Ta_2O_5$, and other oxides which can be readily formed into membrane by such technique as vapor deposition or sputtering can be cited. The details of this will be described later.

Incidentally, in the first through sixth arrangements, explanation will be made on a premise of the transparent dielectric layer B2 being constituted of a transparent nitride layer ($Si_3N_4$).

Further, the thickness of the transparent dielectric layer B2 is a thickness that sets the resonance wavelength of the light reflective layer B to a wavelength included in the wavelengths equal to or greater than 400 nm and equal to or less than 800 nm, in order to obtain a colored condition of the radiative surface H, namely, a colored condition of the radiative cooling device CP when viewed from the presence side of the radiative surface H of the infrared radiative layer A. The details of this will be described later.

By the way, in case the second metal layer B3 is constituted of aluminum or aluminum alloy, the transparent dielectric layer B2 acts also as a transparent anti-alloying layer for preventing alloying between silver or silver alloy of the first metal layer B1 and aluminum or aluminum alloy of the second metal layer B3.

[Specific Arrangement of Radiative Cooling Device]

Figure 2:
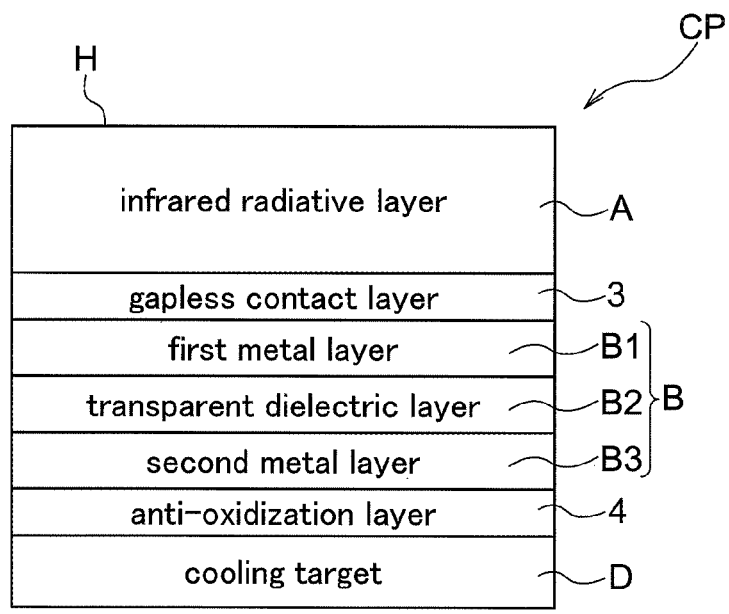
FIG. 2 is a view showing a specific arrangement of the radiative cooling device according to an embodiment.

The radiative cooling device CP is constituted by stacking the first metal layer B1, the transparent dielectric layer B2 and the second metal layer B3 on the infrared radiative layer A as a "substrate". Its specific arrangement, as shown in FIG. 2, is an arrangement in which a gapless contact layer 3 is stacked between the infrared radiative layer A as the substrate and the first metal layer B1 and on the side of the second metal layer B3 opposite to the presence side of the transparent dielectric layer B2, an anti-oxidization layer 4 is stuck.

Namely, the radiant cooling device CP is configured by stacking the gapless contact layer 3, the first metal layer B1, the transparent dielectric layer B2, the second metal layer B3 and the anti-oxidization layer 4 are formed into membranes by e.g. the sputtering technique and stuck one after another on the infrared radiative layer A serving as the substrate.

The gapless contact layer 3 is configured as a membrane of aluminum oxide ($Al_2O_3$) in thickness equal to or greater than 1 nm and equal to or less than 100 nm.

The anti-oxidization layer 4 is configured as a membrane of silicon dioxide ($SiO_2$) or aluminum oxide ($Al_2O_3$) in thickness equal or greater than 1 nm and equal or less than several or few 100 nm's. Incidentally, the first through sixth arrangements will be explained on a premise of a membrane of silicon dioxide ($SiO_2$) being formed.

Accordingly, the radiative cooling device CP is configured such that a portion of light of light L incident on this radiative cooling device CP is reflected by the radiative surface H of the infrared radiative layer A, a portion of light (e.g. visible light, ultraviolet light, etc.) transmitted through the infrared radiative layer A of the light L incident on the radiative cooling device CP is reflected by the first metal layer B1 of the light reflective layer B and light transmitted through this first metal layer B1 is reflected by the second metal layer B3 of the light reflective layer B.

And, the heat input to the radiative cooling device CP from a cooling target D positioned on the side of the anti-oxidization layer 4 opposite to the presence side of the light reflective layer B (e.g. heat input due to heat conduction from the cooling target D) is converted into infrared light (radiation) IR by the infrared radiative layer A to be radiated as such, thereby to cool the cooling target D.

Incidentally, in the instant embodiment, the term "light" L means electromagnetic waves having wavelengths ranging from 10 nm to 20000 nm. Namely, the light L is inclusive of ultraviolet light, infrared light (radiation) IR and the visible light.

Also, in the radiative cooling device CP of the present invention, since the thickness of the transparent dielectric layer B2 is set to such thickness that renders the resonance wavelength of the light reflective layer B to a wavelength included in the wavelengths equal to or greater than 400 nm and equal to or less than 800 nm, there is provided a colored condition of the radiative surface H, namely, a colored condition when the radiative cooling device CP is viewed from the presence side of the radiative surface H of the infrared radiative layer A.

Figures 27, 28:
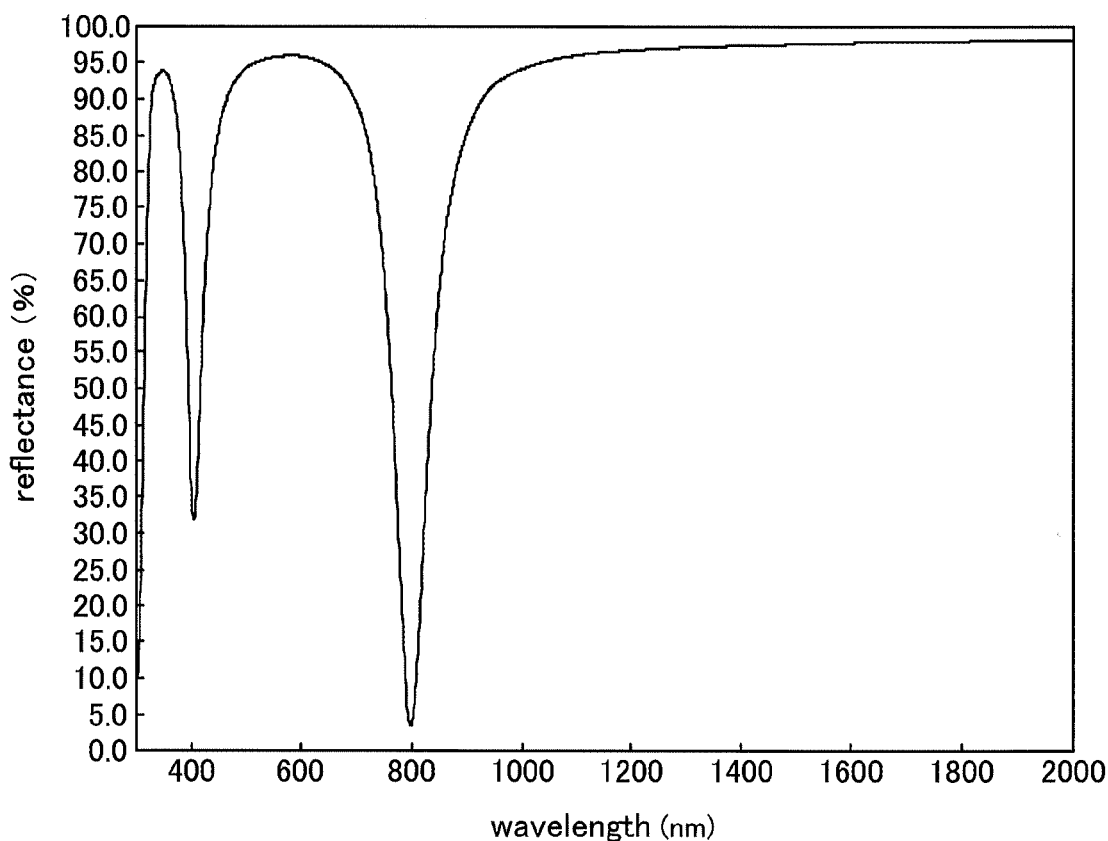
FIG. 27 is a table showing relation between resonance wavelength and colors provided for coloration.
FIG. 28 is a graph showing reflectance when the resonance wavelength is 800 nm.

The relationship between the resonance wavelength and the color provided for coloring is as shown in FIG. 27. For instance, when the resonance wavelength is 400 nm, pale yellow color is provided. When the resonance wavelength is 600 nm, pale blue color is provided. When the resonance wavelength is equal or greater than 700 nm and equal to or less than 750 nm, white color is provided.

Incidentally, in the case of the resonance wavelength being 800 nm, as shown in FIG. 28, a wavelength of 400 nm which is the half wavelength of 800 nm, becomes a resonance wavelength also, thus, pale yellow color is provided like the case of the resonance wavelength being 400 nm.

Incidentally, the "pale yellow" shown in the table of FIG. 27 may be referred to as "light yellow" and the "pale blue" may be referred to as "light blue" in the following discussion.

[Relation Between Thickness of First Metal Layer and Transmittance]

As shown in FIG. 22, when the thickness (membrane thickness) of silver of the first metal layer B1 is reduced stepwise from 100 nm, the transmittance of silver increases significantly when the thickness falls below 10 nm.

The radiative cooling device CP of the present invention is configured such that light of the resonance frequency (resonance wavelength) is resonated within the transparent dielectric layer B2, thus causing color development.

More particularly, when it is said that the light of the resonance frequency (resonance wavelength) is resonated within the light reflective layer B, this means that the light of the resonance frequency (resonance wavelength) is reflected back and forth many times in repetition between the first metal layer B1 and the second metal layer B3 which form like a coupled mirror device, namely, by containing this light as much as possible for a long period of time within the transparent dielectric layer B2, so that only the light of the narrow band range including the light of the resonance frequency (wavelength) may be absorbed pinpointedly by the first metal layer B1 and the second metal layer B2, as a result of which the color is developed.

Therefore, if the thickness (membrane thickness) of the silver of the first metal layer B1 is too large, most of the light will be reflected by the silver of the first metal layer B1, thus hardly any light being transmitted to reach the transparent dielectric layer B2, thus unable to cause "resonance" which is important for the optical control.

Conversely, if the thickness (membrane thickness) of the silver of the first metal layer B1 is too small, the transmittance of silver becomes too high to contain the light sufficiently for the light to be absorbed by the metal (resonation), so that the light absorbance will decrease. Further, with weakening of the resonance effect, the broadening of the wavelength range (absorption peak) absorbed by the metal will tend to occur.

Namely, the thickness (membrane thickness) of silver of the first metal layer B1 should not be too great or too small, in order to cause the light reflective layer B to have a high reflectance in the range of the solar light spectrum and also have a steep absorption peak for coloration.

That is, as the thickness (membrane thickness) of silver of the first metal layer B1, there is needed such thickness (membrane thickness) having ability to contain the light therein (with a certain level of reflectance) and that also ability to introduce (transmit) the light to the place reserved for such containment/retention of light (within the transparent dielectric layer B2), in an appropriate balance therebetween.

[Relation Between Thickness of First Metal Layer and Reflectance]

FIG. 23 shows changes occurring in the reflectance of the radiative cooling device CP when the thickness of the first metal layer B1 was changed in the range equal to or greater than 40 nm and equal to or less than 100 nm, in the case of setting the thickness (membrane thickness) of TEMPAX constituting the infrared radiative layer A to 1 mm, setting the thickness (membrane thickness) of $Si_3N_4$ constituting the transparent dielectric layer B2 to 100 nm and setting the thickness (membrane thickness) of silver constituting the second metal layer B3 to 100 nm.

Similarly, FIG. 24 shows changes occurring in the reflectance of the radiative cooling device CP when the thickness of the first metal layer B1 was changed in the range equal to or greater than 1 nm and equal to or less than 40 nm, in the case of setting the thickness (membrane thickness) of TEMPAX constituting the infrared radiative layer A to 1 mm, setting the thickness (membrane thickness) of $Si_3N_4$ constituting the transparent dielectric layer B2 to 100 nm and setting the thickness (membrane thickness) of silver constituting the second metal layer B3 to 100 nm.

As shown in FIG. 23, when the thickness (membrane thickness) of silver of the first metal layer B1 is progressively decreased from 100 nm toward 40 nm, in association with increase of the transmittance of silver of the first metal layer B1, increasing amount of light will enter the transparent dielectric layer B2, so that an increasing amount of the light of the resonance wavelength will be absorbed.

Further, as shown in FIG. 24, when the thickness (membrane thickness) of silver of the first metal layer B1 is decreased from 40 nm toward 10 nm, the reflectance of silver of the first metal layer B1 decreases correspondingly. As a result, the effect of containing/retaining light within the transparent dielectric layer B2 (resonance) weakens and the absorption peak becomes smaller, and moreover, this absorption peak broadens.

Further, in comparison between the two illustrations, it may be understood that when the peak of resonance (resonance wavelength) is to be formed in the vicinity of 600 nm, it is appropriate to set the thickness (membrane thickness) of silver of the first metal layer B1 to 40 nm approximately.

That is, as shown in FIG. 22, as the transmittance of silver varies with the wavelength, depending on the wavelength to be resonated, the suitable thickness (membrane thickness) of the silver will change accordingly.

However, in order to provide a coloration condition of the radiative surface H of the radiative cooling device CP, the wavelength to be resonated is the range of visible light (equal to or greater than 400 nm and equal to or less than 800 nm). And, the thickness (membrane thickness) of silver of the first metal layer B1 suitable for controlling in this wavelength range will be confined within the range equal to or greater than 10 nm and equal to or less than 100 nm.

Incidentally, as shown in FIG. 22, if the thickness (membrane thickness) of silver of the first metal layer B1 is set to 100 nm approximately, the wavelength of light transmitted through the first metal layer B1 will become equal to or less than 500 nm. The controllable range of resonance wavelength will vary, depending on the thickness (membrane thickness) of silver of the first metal layer B1, e.g. the controllable resonance wavelength becoming equal to or less than 500 nm.

And, in case the thickness (membrane thickness) of silver of the first metal layer B1 is set to equal to or greater than 25 nm and equal to or less than 80 nm, it becomes possible to control the entire range of wavelength equal to or greater than 400 nm and equal to or less than 800 nm as the resonance wavelength.

[Thickness of Transparent Dielectric Layer]

Figure 21:
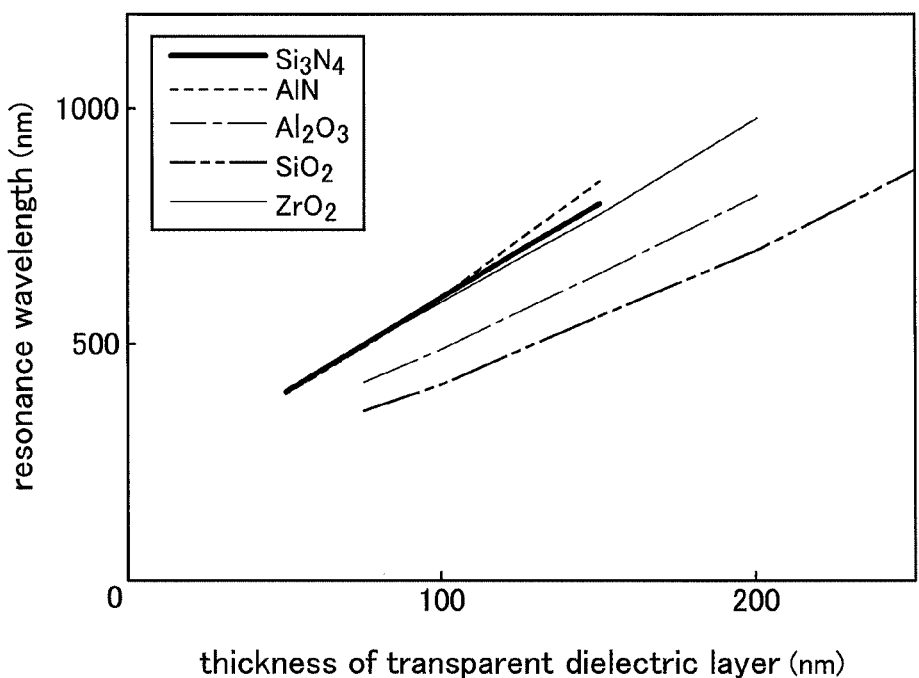
FIG. 21 is a view showing relationship between thickness of transparent dielectric layer and resonance wavelength.

The thickness (membrane thickness) of the transparent dielectric layer B2 is a thickness that renders the resonance wavelength of the light reflective layer B to a wavelength included in the wavelength range equal to or greater than 400 nm and equal to or less than 800 nm, specifically, a thickness equal to or greater than 30 nm and equal to or less than 230 nm (see FIG. 21).

More particularly, the (surface) plasmon resonance wavelength is determined precisely by refractive index distributions of the first metal layer B1, the transparent dielectric layer B2 and the second metal layer B3. This can be roughly estimated by the following Formula (1).

$$\lambda = L * 4 * n \quad (1)$$

where, $\lambda$ is the resonance wavelength, L is a membrane thickness of the transparent dielectric layer, n is a representative refractive index.

Figure 20:
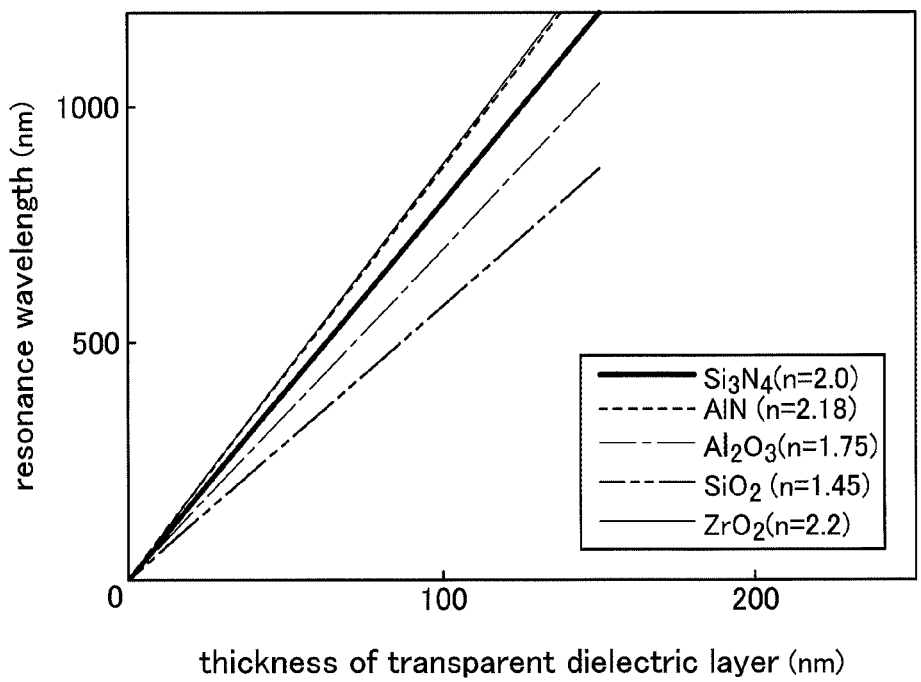
FIG. 20 is a view showing reference relationship between thickness of transparent dielectric layer and resonance wavelength.

FIG. 20 shows relationship between representative refractive indices (n) of a group of (some) materials usable as the transparent dielectric layer B2, the thickness (membrane thickness) L of the transparent dielectric layer B2 and the resonance wavelength $\lambda$.

Incidentally, the reason for the above notation "representative" refractive indices (n) is that the refractive index of material varies with the wavelength. In this illustration, there are shown average refractive indices of the respective materials in the visible light range (equal to or greater than 400 nm and equal to or less than 800 nm).

Further, the resonance wavelength $\lambda$ shown in FIG. 20 is the resonance wavelength in case only one layer for each layer exists, being different from the resonance wavelength in the case of the transparent dielectric layer B2 being sandwiched between such metals as silver, aluminum, copper, etc. Namely, this value is a value for use as a "reference" in optical designing.

FIG. 21 shows relationship between the thickness (membrane thickness) and the resonance wavelength in case the transparent dielectric layer B2 is bound by silver from opposed sides.

In case the transparent dielectric layer B2 is bound by silver from opposed sides, in comparison with the case of one layer alone shown in FIG. 20, the resonance wavelength $\lambda$ for a same thickness (membrane thickness) L shifts to the shorter wavelength side. This is a phenomenon which occurs because, due to the presence of metal, the electromagnetic field of the transparent dielectric layer B2 is concentrated around the center of the transparent dielectric layer B2.

The amount of such shift toward the shorter wavelength side will differ depending on the kind of binding metal. However, as shown in FIG. 29, the amount of shift to the shorter wavelength side increases progressively in the order of aluminum, silver and copper.

Figure 29:
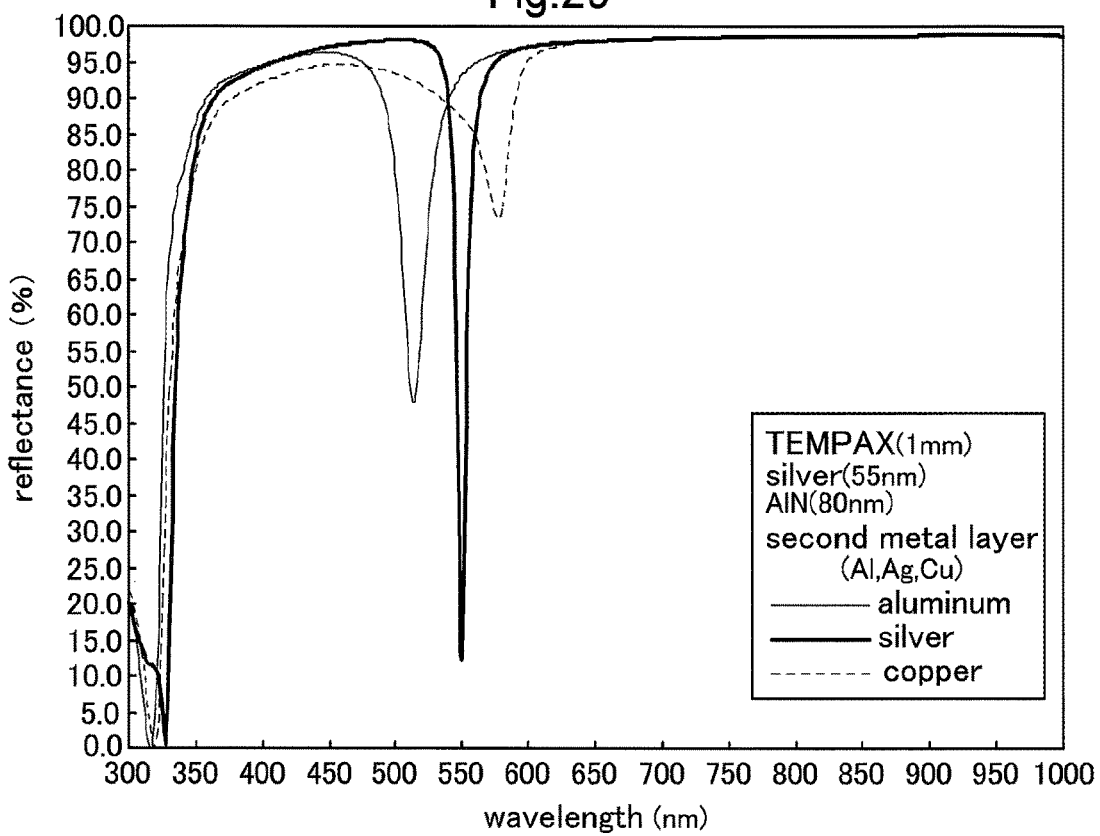
FIG. 29 is a graph showing reflectance when the metal constituting the second metal layer is changed.

Namely, FIG. 29 shows the reflectance in case the infrared radiative layer A comprises 1 mm (thickness) TEMPAX, the first metal layer B1 comprises 55 nm silver, the transparent dielectric layer B2 comprises 80 nm aluminum nitride (AlN), the second metal layer B3 comprises 100 nm aluminum, 100 nm silver, and 100 nm copper. As shown, in the order of aluminum, silver and copper, the resonance wavelength $\lambda$ shifts greater toward the shorter wavelength side.

Figure 30:
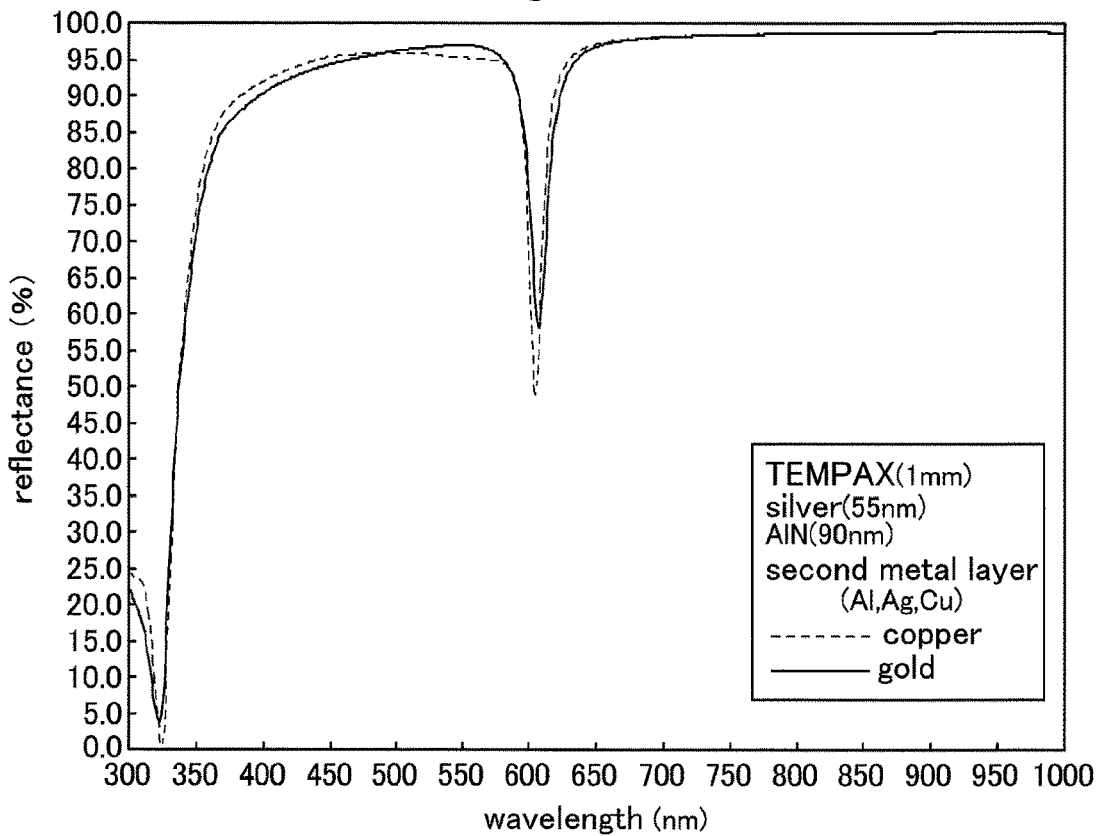
FIG. 30 is a graph showing reflectance when the second metal layer is constituted of gold and copper.

Incidentally, FIG. 30 shows the reflectance in case the infrared radiative layer A comprises 1 mm (thickness) TEMPAX, the first metal layer B1 comprises 55 nm silver, the transparent dielectric layer B2 comprises 80 nm aluminum nitride (AlN), the second metal layer B3 comprises 100 nm gold and 100 nm copper. As shown, respecting gold and copper, the amounts of shift of the resonance wavelength $\lambda$ toward the shorter wavelength side are about same.

[Specific Example of Coloration of Radiative Surface]

In the first through fourth arrangements, in case the infrared radiative layer A comprises 1 mm TEMPAX, the gapless contact layer 3 comprises 5 nm aluminum oxide ($Al_2O_3$), the first metal layer B1 comprises 35 nm silver, the transparent dielectric layer B2 comprises silicon nitride ($Si_3N_4$), the second metal layer B3 comprises 100 nm silver and the anti-oxidization layer 4 comprises 10 nm silicon oxide ($SiO_2$), conditions of coloration of the radiative surface H in the first to fourth arrangement will be explained.

Figure 3:
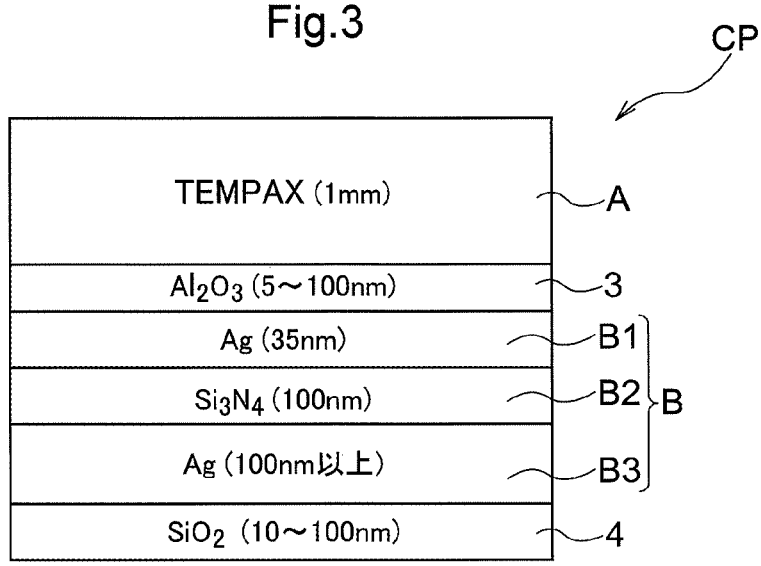
FIG. 3 is a view showing a first arrangement of the radiative cooling device.
Figure 5:
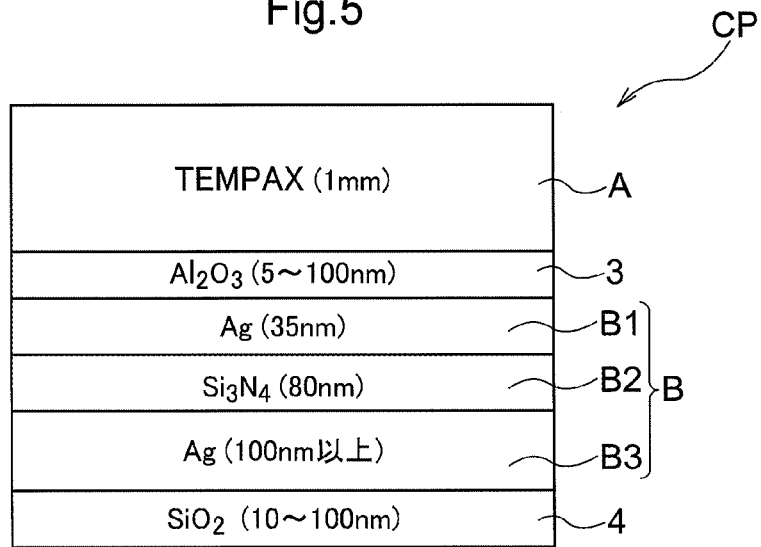
FIG. 5 is a view showing a second arrangement of the radiative cooling device.

As shown in FIG. 3, with the first arrangement in which the thickness (membrane thickness) of silicon nitride ($Si_3N_4$) forming the transparent dielectric layer B2 is set to 100 nm, the condition of coloration of the radiative surface His light blue. As shown in FIG. 5, with the second arrangement in which the thickness (membrane thickness) of silicon nitride ($Si_3N_4$) forming the transparent dielectric layer B2 is set to 80 nm, the condition of coloration of the radiative surface H is light pink.

Figure 7:
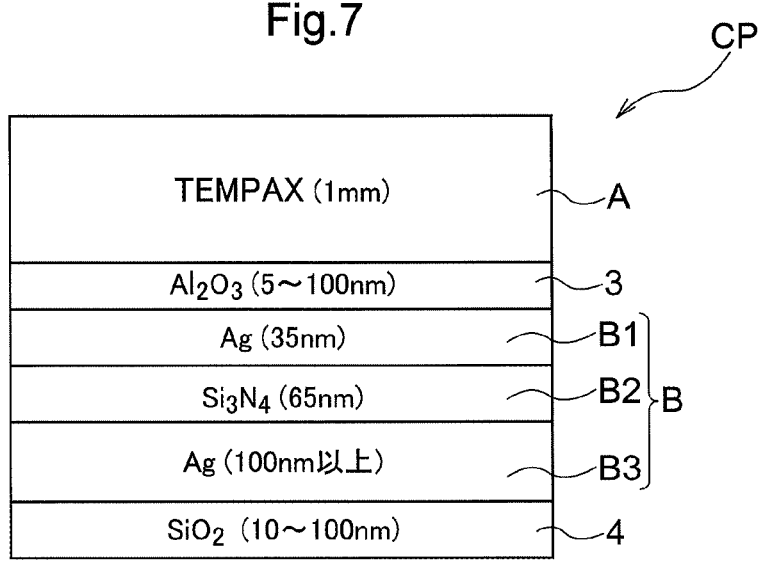
FIG. 7 is a view showing a third arrangement of the radiative cooling device.
Figure 9:
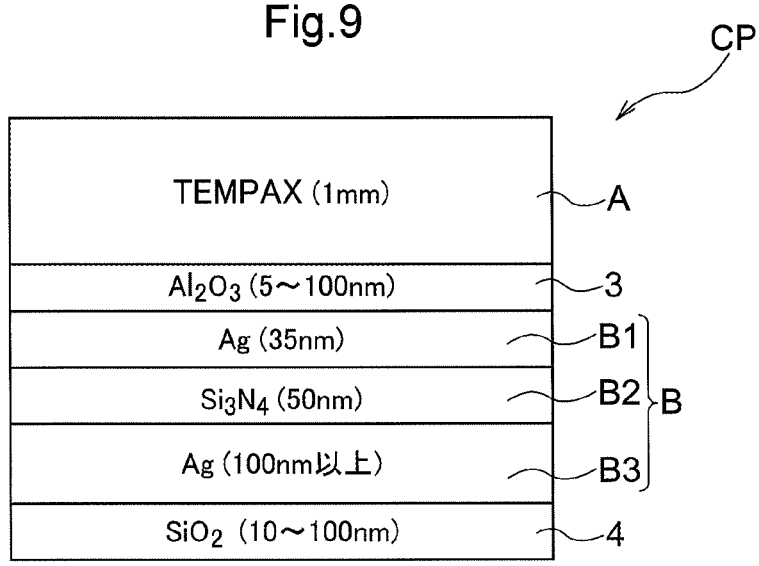
FIG. 9 is a view showing a fourth arrangement of the radiative cooling device.

Further, as shown in FIG. 7, with the third arrangement in which the thickness (membrane thickness) of silicon nitride ($Si_3N_4$) forming the transparent dielectric layer B2 is set to 65 nm, the condition of coloration of the radiative surface H is light red. As shown in FIG. 9, with the fourth arrangement in which the thickness (membrane thickness) of silicon nitride ($Si_3N_4$) forming the transparent dielectric layer B2 is set to 50 nm, the condition of coloration of the radiative surface H is light yellow.

Figure 4:
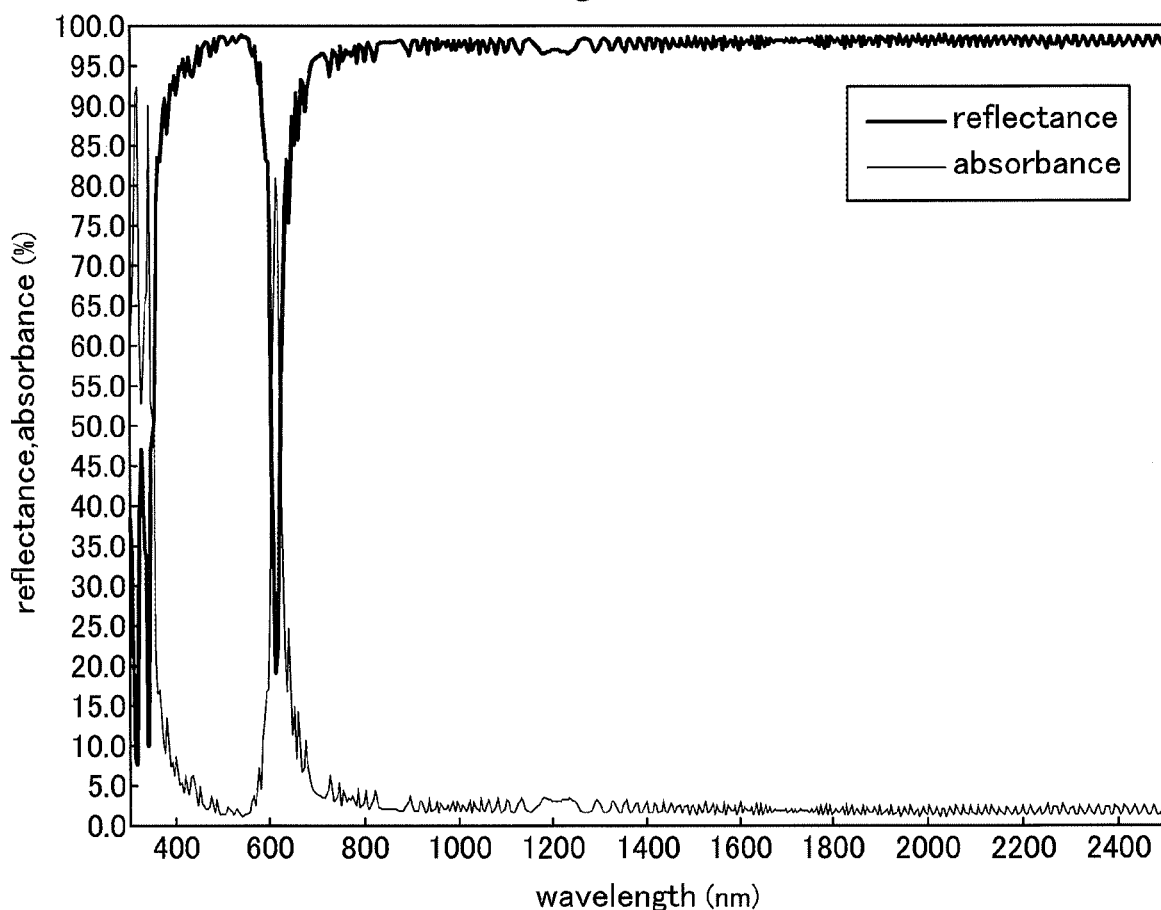
FIG. 4 is a graph showing reflectance and absorbance of the radiative cooling device of the first arrangement.
Figure 6:
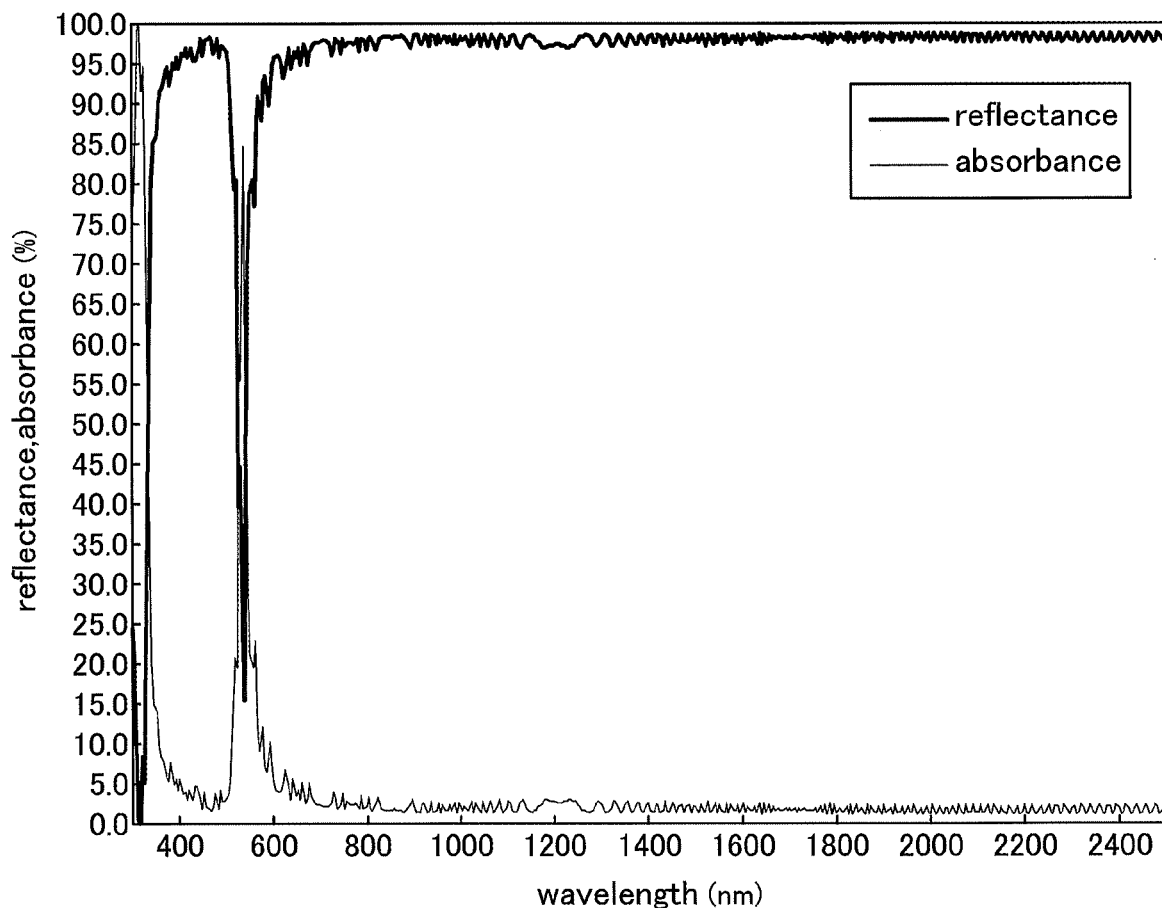
FIG. 6 is a graph showing reflectance and absorbance of the radiative cooling device of the second arrangement.
Figure 8:
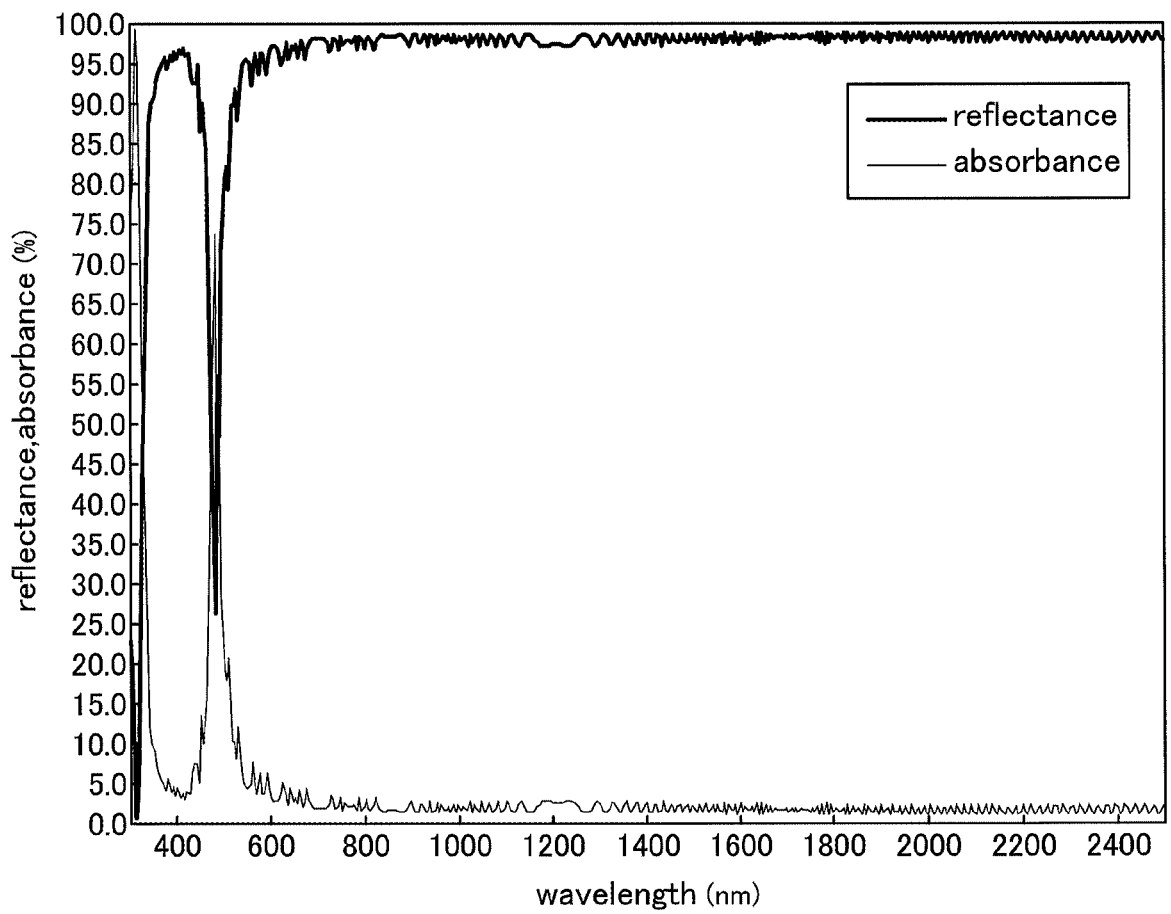
FIG. 8 is a graph showing reflectance and absorbance of the radiative cooling device of the third arrangement.
Figure 10:
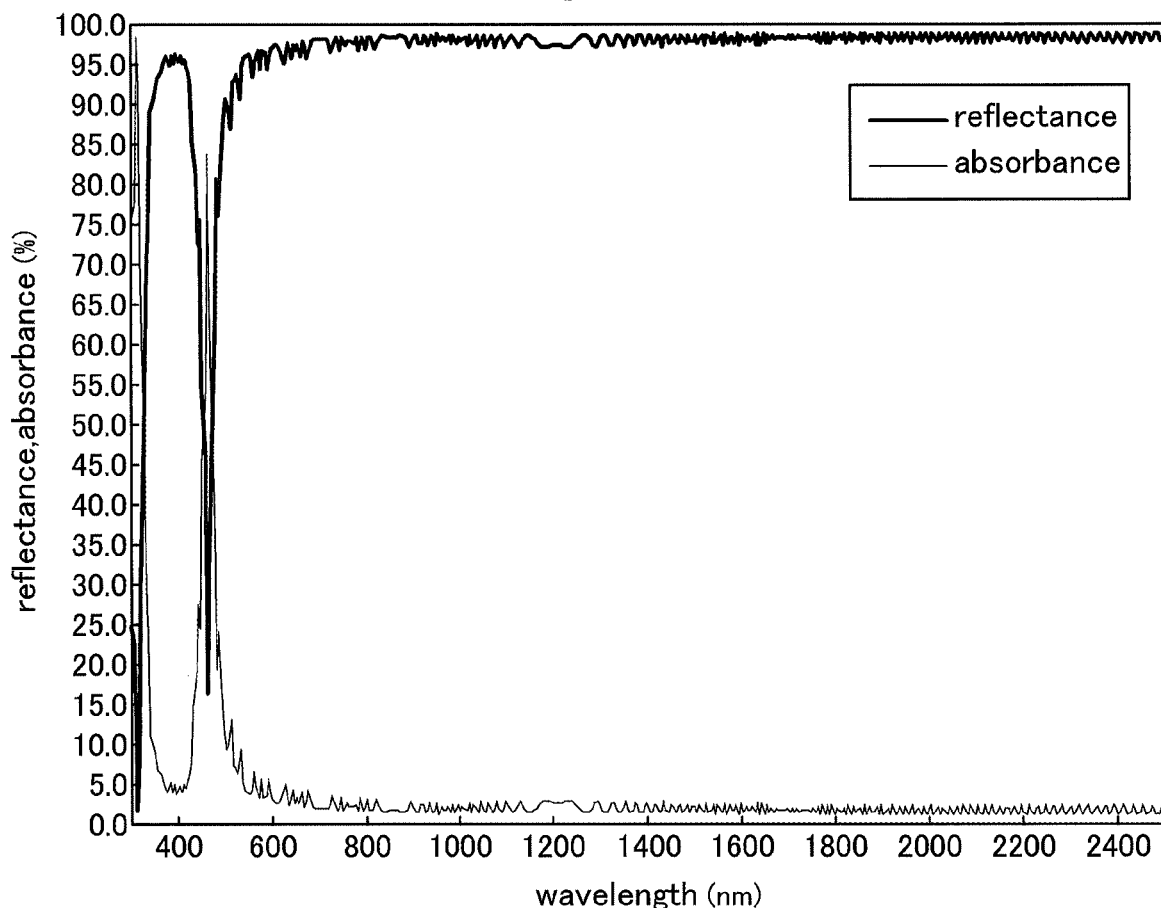
FIG. 10 is a graph showing reflectance and absorbance of the radiative cooling device of the fourth arrangement.

Incidentally, FIG. 4 shows reflectance and absorbance of the first arrangement, FIG. 6 shows reflectance and absorbance of the second arrangement, FIG. 8 shows reflectance and absorbance of the third arrangement, and FIG. 10 shows reflectance and absorbance of the fourth arrangement, respectively.

Figure 11:
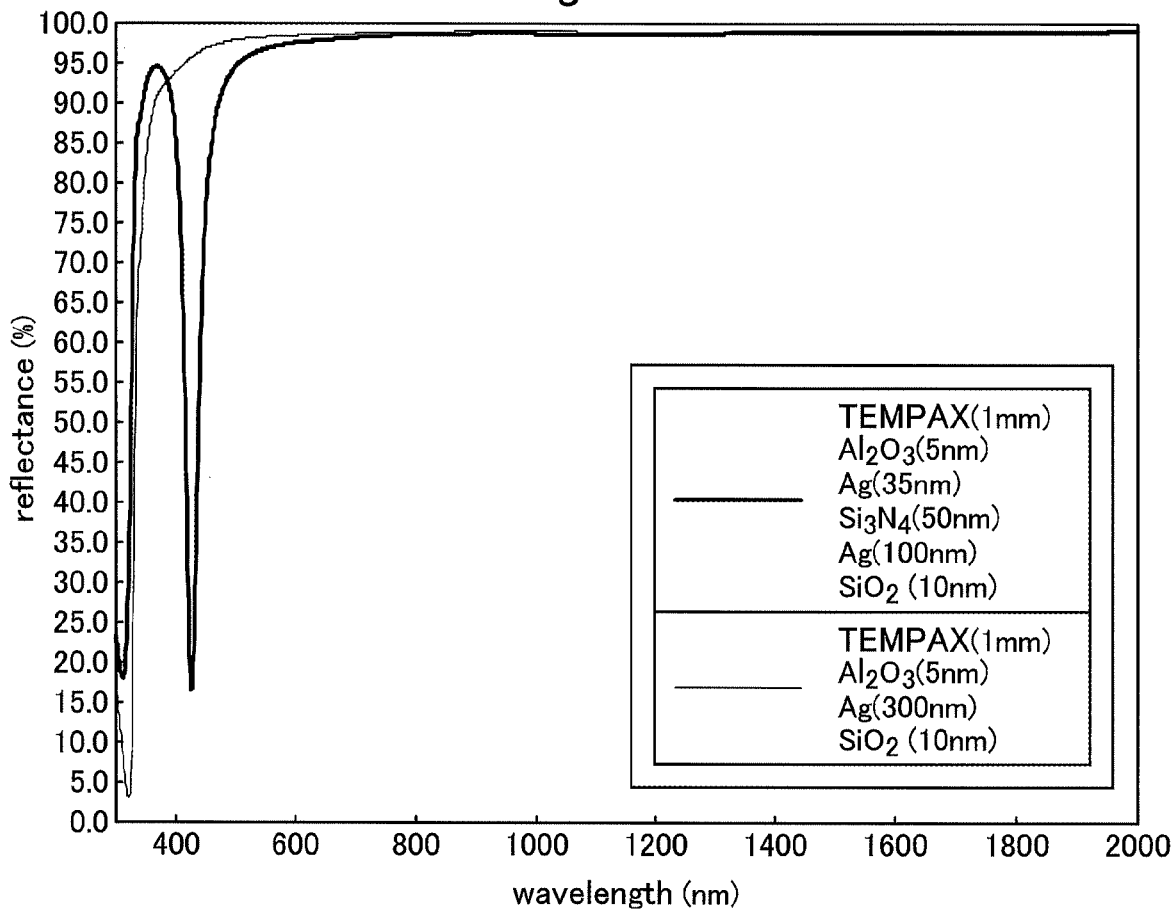
FIG. 11 is a graph showing reflectance of the radiative cooling device of the fourth arrangement and a conventional radiative cooling device.

By the way, FIG. 11 shows reflectance of the fourth arrangement and reflectance of comparison arrangement. In this comparison arrangement, the infrared radiative layer A comprises TEMPAX having 1 mm thickness, the gapless contact layer 3 comprises 5 nm aluminum oxide ($Al_2O_3$), the light reflective layer B comprises 300 nm silver and the anti-oxidization layer 4 comprises 10 nm silicon dioxide ($SiO_2$).

As shown, the reflectance of the fourth arrangement becomes lower in the range of the resonance wavelength, whereas the reflectance of the comparison arrangement which is a conventional radiative cooling device CP is as high as 95% or higher in the range of the visible light (equal to or greater than 400 nm and equal to or less than 800 nm).

Figure 13:
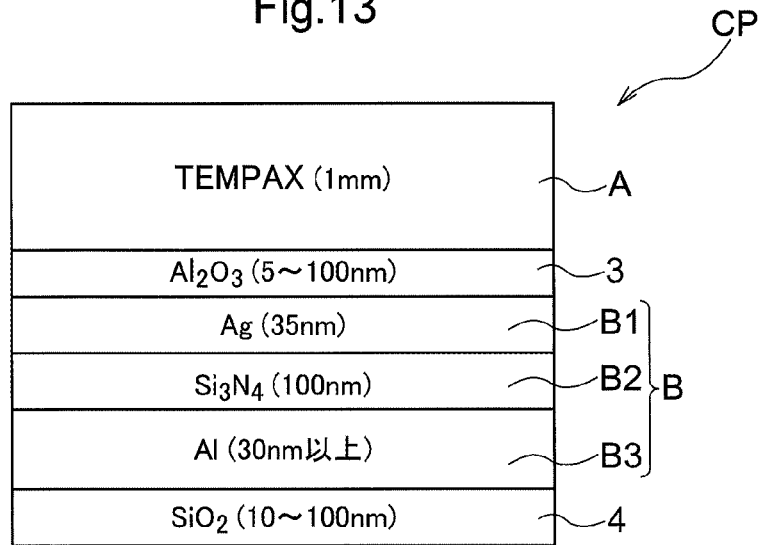
FIG. 13 is a view showing a fifth arrangement of the radiative cooling device.

Also, in the fifth arrangement shown in FIG. 13, in which the infrared radiative layer A comprises TEMPAX having 1 mm thickness, the gapless contact layer 3 comprises 5 nm aluminum oxide ($Al_2O_3$), the first metal layer B1 comprises 35 nm silver, the transparent dielectric layer B2 comprises 100 nm silicon nitride ($Si_3N_4$), the second metal layer B3 comprises 30 nm aluminum, and the anti-oxidization layer 4 comprises 10 nm silicon dioxide ($SiO_2$), the condition of coloration of the radiative surface H is blue.

Figure 14:
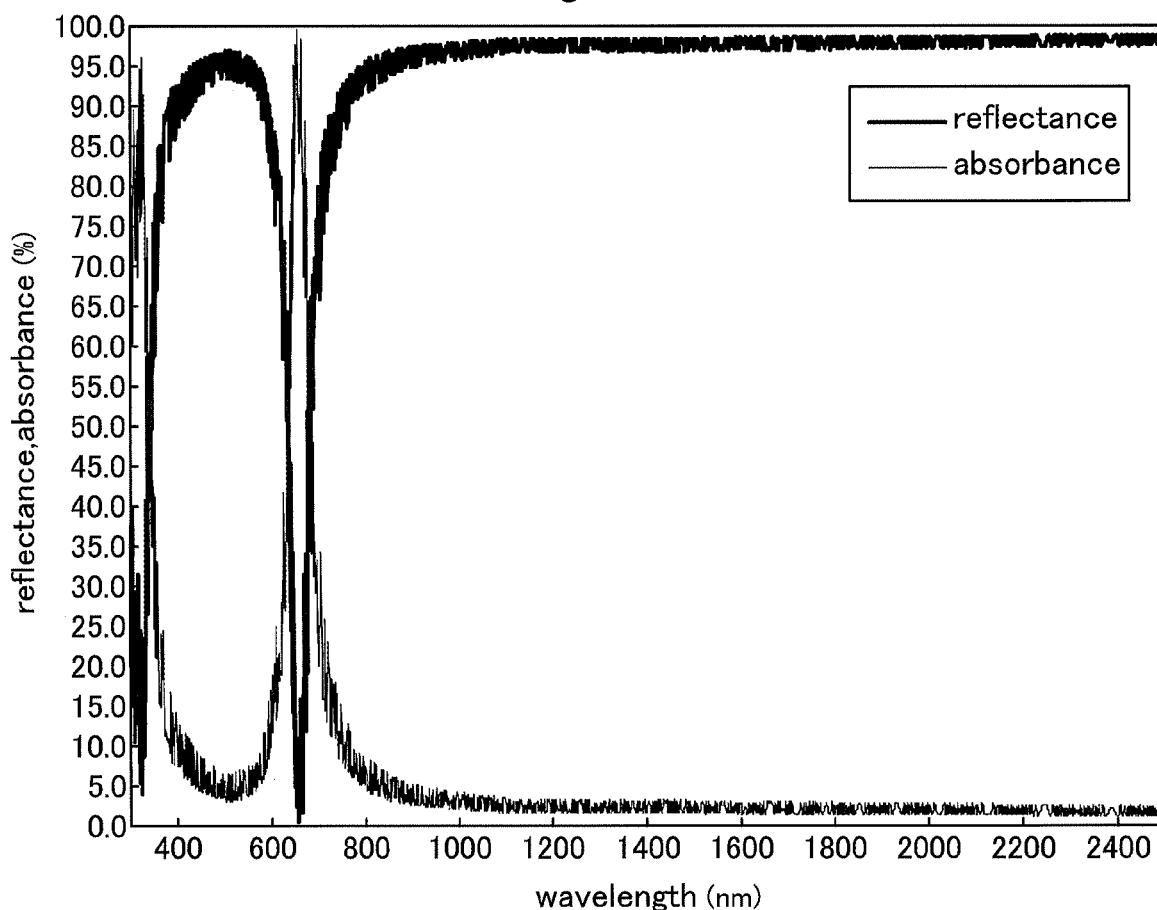
FIG. 14 is a graph showing reflectance and absorbance of the radiative cooling device of the fifth arrangement.

Incidentally, FIG. 14 shows reflectance and absorbance of the fifth arrangement.

Figure 31:
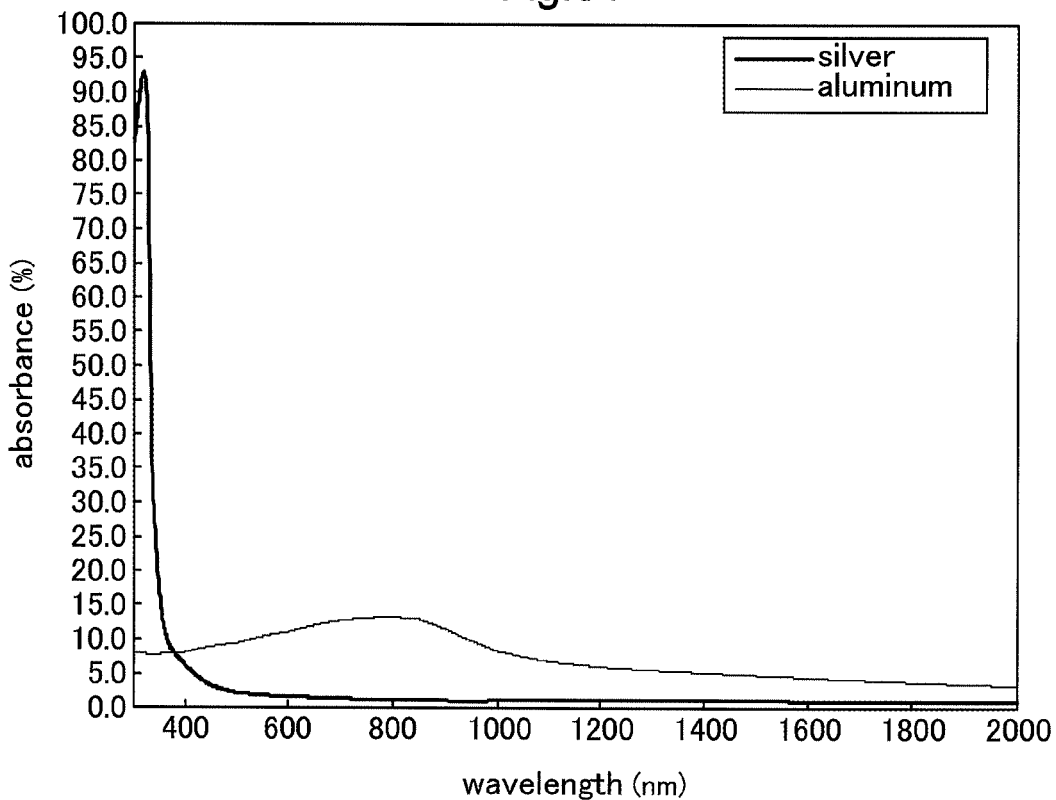
FIG. 31 is a graph showing absorbance of silver and aluminum.

By the way, as shown in FIG. 31, since aluminum or aluminum alloy has a higher absorbance for the visible light than silver or silver alloy, the condition of coloration of the radiative surface H becomes distinct blue.

Further, in the sixth arrangement shown in FIG. 15, the infrared radiative layer A comprises 1 mm (thickness) TEMPAX, the gapless contact layer 3 comprises 5 nm aluminum oxide ($Al_2O_3$), the first metal layer B1 comprises 35 nm silver, the transparent dielectric layer B2 comprises 100 nm silicon nitride ($Si_3N_4$), the second metal layer B3 comprises a stacked assembly of a first layer b1 of 10 nm silver and a second layer b2 of 60 nm aluminum and the anti-oxidization layer 4 comprises 10 nm silicon dioxide ($SiO_2$), the condition of coloration of the radiative surface H becomes blue.

Figure 16:
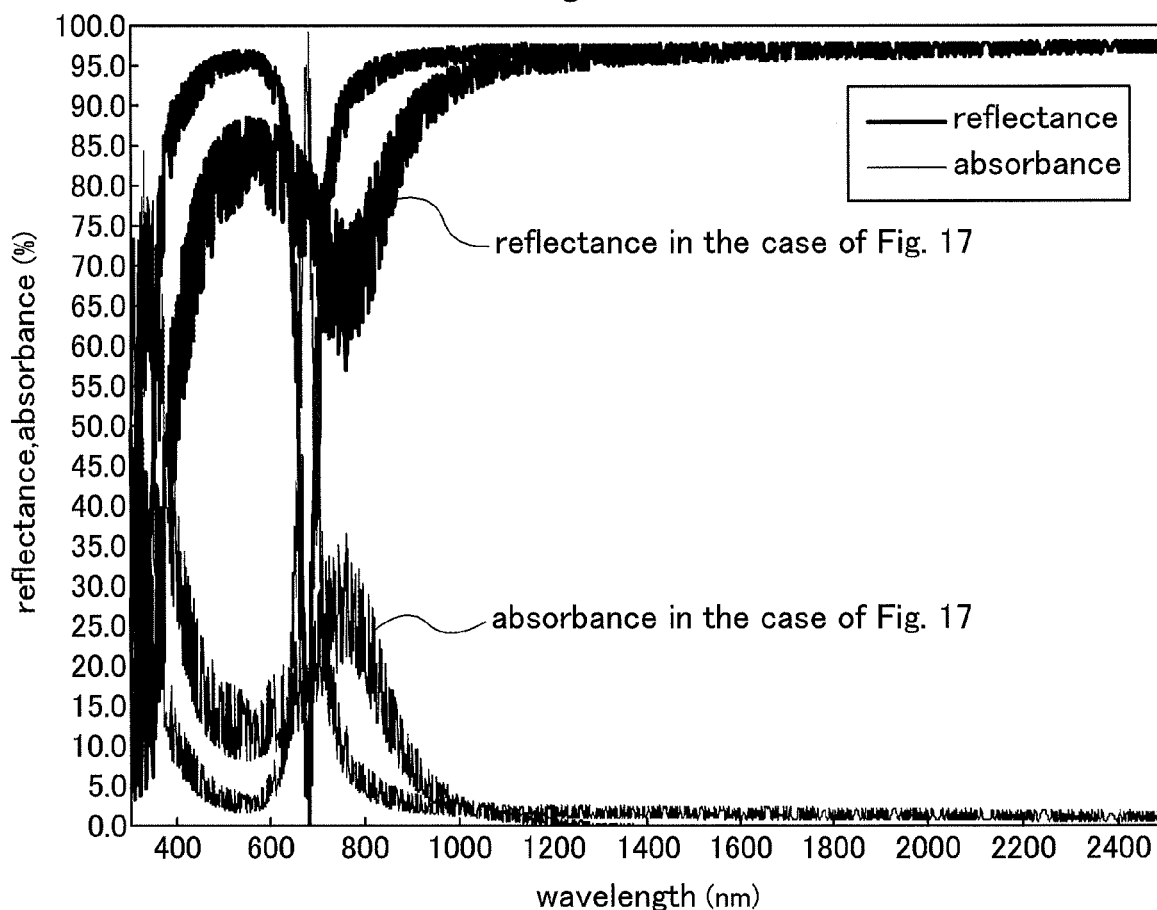
FIG. 16 is a graph showing reflectance and absorbance of the radiative cooling device of the sixth arrangement.
Figures 17, 18:
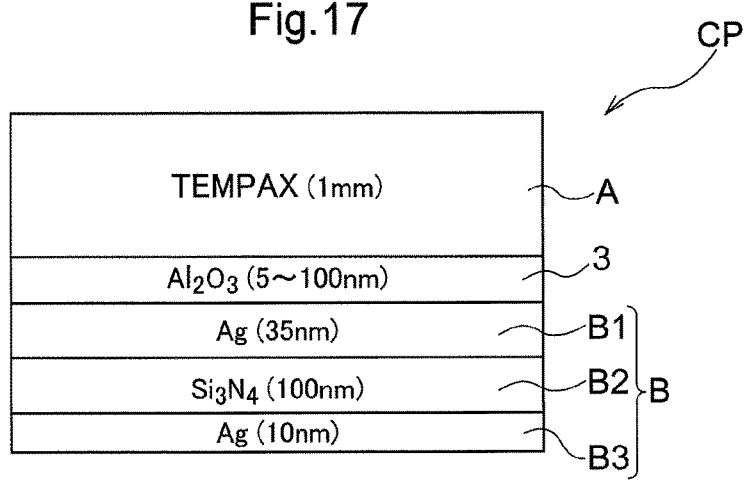
FIG. 17 is a view showing a radiative cooling device having a comparison arrangement.
FIG. 18 is a table showing relations between the first through eleventh arrangements of the radiative cooling device and XY chromaticity.

Incidentally, FIG. 16 shows reflectance and absorbance of the sixth arrangement and reflectance and absorbance of the comparison arrangement shown in FIG. 17.

In the comparison arrangement shown in FIG. 17, the infrared radiative layer A comprises TEMPAX having 1 mm thickness, the gapless contact layer 3 comprises aluminum oxide ($Al_2O_3$) in thickness equal to or greater than 5 nm and equal to or less than 100 nm, the first metal layer B1 comprises 35 nm silver, the transparent dielectric layer B2 comprises 100 nm silicon nitride ($Si_3N_4$), the second metal layer B3 comprises 10 nm silver.

As shown in FIG. 16, with the comparison arrangement, due to absence of aluminum in the second metal layer B3, there is not much reduction in the reflectance in the range of the resonance wavelength in comparison with the sixth arrangement.

[XY Chromaticity Diagram]

Figure 19:
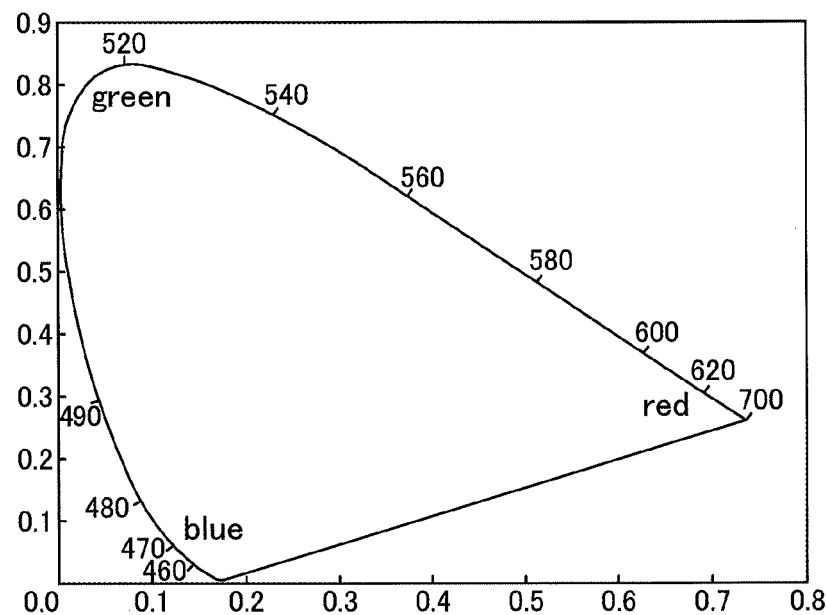
FIG. 19 is a view showing XY chromaticity diagram.

The condition of coloration provided to the radiative surface H can be represented by the XY chromaticity diagram shown in FIG. 19. The table shown in FIG. 18 shows the x axis coordinate values and y axis coordinate values in the XY chromaticity diagram of the first through sixth arrangements.

Incidentally, the illustrated XY chromaticities correspond to D65 light illumination.

For instance, in the first arrangement, the x axis coordinate value is 0.285 and the y axis coordinate value is 0.330, thus being blue in the range near white, that is, light blue (pale blue).

The same is true with the second through sixth arrangements.

Incidentally, the notations: "pink", "red" and "yellow" shown in the table of FIG. 18 represent "pale pink" (light pink), "pale red" (light red) and "pale yellow" (light yellow), respectively.

By the way, in the table of FIG. 18, in addition to the first through sixth arrangements, there are also shown the XY chromaticity of the seventh through eleventh arrangements.

The seventh arrangement is a case in which the infrared radiative layer comprises TEMPAX having 1 mm thickness, the gapless contact layer 3 comprises 5 nm aluminum oxide ($Al_2O_3$), the first metal layer B1 comprises 30 nm silver, the transparent dielectric layer B2 comprises 90 nm silicon nitride ($Si_3N_4$) and the second metal layer B3 comprises 30 nm aluminum, which provides light pink color to the coloration condition of the radiative surface H.

The eighth arrangement is a case in which the infrared radiative layer comprises TEMPAX having 1 mm thickness, the gapless contact layer 3 comprises 5 nm aluminum oxide ($Al_2O_3$), the first metal layer B1 comprises 55 nm silver, the transparent dielectric layer B2 comprises 90 nm silicon nitride ($Si_3N_4$) and the second metal layer B3 comprises 100 nm copper, which provides light blue color (pale blue) to the coloration condition of the radiative surface H.

Figure 25:
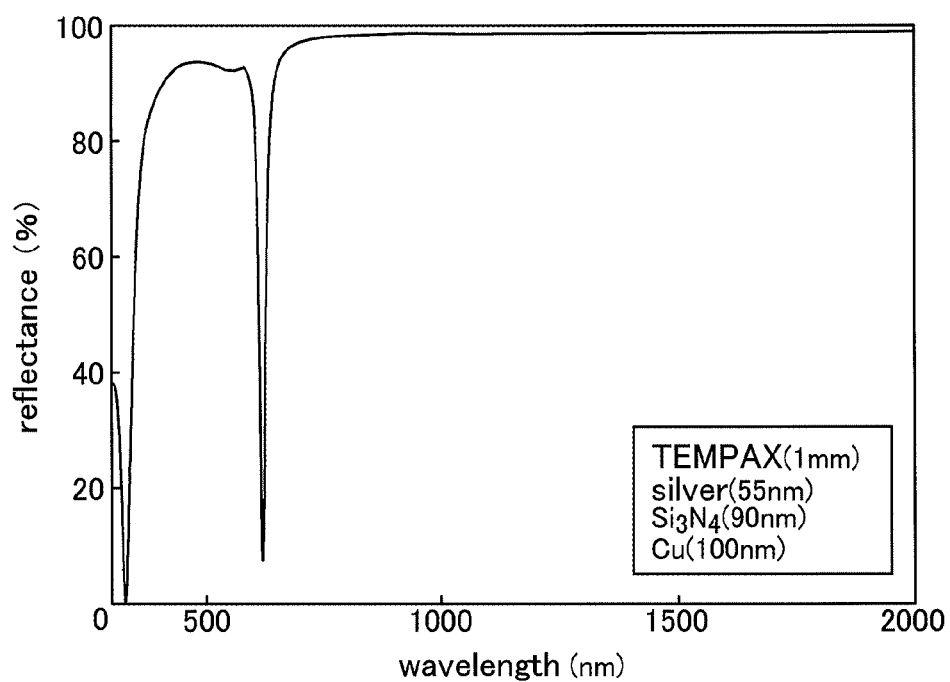
FIG. 25 is a view showing reflectance of a radiative cooling device of an eighth arrangement.

Incidentally, FIG. 25 shows the reflectance of the eighth arrangement.

The ninth arrangement is a case in which the infrared radiative layer comprises TEMPAX having 1 mm thickness, the gapless contact layer 3 comprises 5 nm aluminum oxide ($Al_2O_3$), the first metal layer B1 comprises 55 nm silver, the transparent dielectric layer B2 comprises 90 nm silicon nitride ($Si_3N_4$) and the second metal layer B3 comprises 100 nm gold, which provides light blue color (pale blue) to the coloration condition of the radiative surface H.

The tenth arrangement is a case in which the infrared radiative layer comprises TEMPAX having 1 mm thickness, the gapless contact layer 3 comprises 5 nm aluminum oxide ($Al_2O_3$), the first metal layer B1 comprises 35 nm silver, the transparent dielectric layer B2 comprises 100 nm silicon oxide ($SiO_2$) and the second metal layer B3 comprises 100 nm silver, which provides light yellow color to the coloration condition of the radiative surface H.

The eleventh arrangement is a case in which the infrared radiative layer comprises TEMPAX having 1 mm thickness, the gapless contact layer 3 comprises 5 nm aluminum oxide ($Al_2O_3$), the first metal layer B1 comprises 35 nm silver, the transparent dielectric layer B2 comprises a stacked assembly of 50 nm silicon nitride ($Si_3N_4$) and 70 nm silicon oxide ($SiO_2$), and the second metal layer B3 comprises 100 nm silver, which provides light blue color (pale blue) to the coloration condition of the radiative surface H.

[Cooling Capacity of Radiative Cooling Device]

Figure 12:
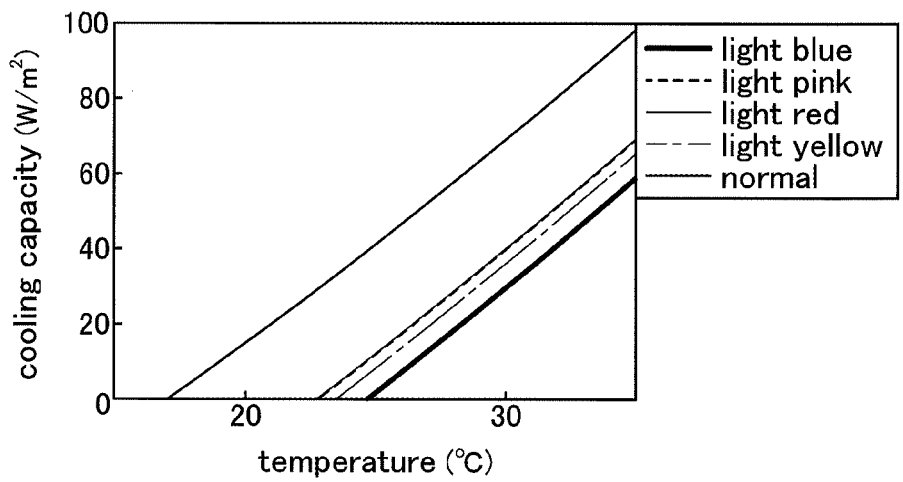
FIG. 12 is a graph showing cooling capacities of the radiative cooling devices of the first through fourth arrangements and the conventional radiative cooling device.

FIG. 12 shows cooling capacities of the radiative cooling device CP of the first through fourth arrangements and the cooling capacity of the comparison arrangement which is the conventional radiative cooling device which was explained with reference to FIG. 11.

Incidentally, in FIG. 12, the radiative cooling devices CP of the first through fourth arrangements are represented as light blue, light pink, light red and light yellows respectively whereas the conventional radiative cooling device CP is represented as "normal".

For the illustrated cooling capacities, calculations thereof were made in the atmosphere in average summer time in Osaka at the time of meridian crossing under irradiation of sunshine of AM1.5G at the outside temperature of 30° C.

More particularly, the calculations were made with using a model of late August in which the solar light energy is 1000 W/m$^2$, the outside temperature is 30° C. and the atmospheric radiant energy is 387 W/m$^2$.

The temperatures on the horizontal axis represent temperatures of the bottom face portion (bottom face portion opposite to the radiant surface H) of the radiant cooling device CP and the convection is not taken into consideration.

As shown, when the outside temperature and the bottom portion of the radiant cooling device CP are same as both being 30° C., even the colored radiative cooling device CP of the present invention has a radiant cooling capacity near 40 W/m$^2$.

Namely, although the inventive colored radiative cooling device CP suffers certain reduction in the radiative cooling capacity as compared with the conventional radiative cooling device, yet it can achieve radiative cooling capacity even at the time of meridian passing in summer time.

Incidentally, the radiative cooling capacities of the light pink (second arrangement) and the light red (third arrangement) are substantially same.

[Specific Examples of Transparent Dielectric Layer]

The transparent dielectric layer B2 can be constituted of a transparent nitride membrane or a transparent oxide membrane. As specific examples of the transparent nitride membrane, $Si_3N_4$ and AlN can be cited as described above.

Further, as specific examples of the transparent oxide membrane, the following can be cited. In the following explanation, the materials usable as the transparent dielectric membrane B2 of the present invention are described under the group classification.

The first group element oxides: $Li_2O$, $Na_2O$, $K_2O$.

The second group element oxides: BeO, MgO, CaO, SrO, BaO.

The fourth group element oxides: $TiO_2$, $ZrO_2$, $HfO_2$.

The fifth group element oxides: $Nb_2O_5$, $Ta_2O_5$.

The thirteenth group element oxides: $B_2O_3$, $Al_2O_3$, $Ga_2O_3$.

The fourteenth group element oxides: $SiO_2$, $GeO_2$, $SnO_2$.

Incidentally, as materials to be prepared into membrane by the sputtering technique or the like, there are $Al_2O_3$, $SiO_2$, $TiO_2$, $ZrO_2$, $HfO_2$, $Nb_2O_5$, $Ta_2O_5$.

These materials are superior to other oxides in that they can be formed into membrane easily.

[Other Embodiments]

Next, other embodiments will be recited on after another.

(1) In the foregoing embodiment, there was disclosed the exemplary case in which the first metal layer B1, the transparent dielectric layer B2 and the second metal layer B3 are stacked on the infrared radiative layer A as a substrate. Alternatively, on a substrate different from the infrared radiative layer A, the second metal layer B3, the transparent dielectric layer B2 and the first metal layer B1 may be stacked to form the light reflective layer B, with the infrared radiative layer A and the light reflective layer B being superposed each other. In this case, a certain gap may be present as long as it is still capable of heat conduction, between the infrared radiative layer A and the light reflective layer B.

(2) In the foregoing embodiment, there was disclosed the exemplary case of the anti-oxidization layer 4 being provided. However, in case e.g. the membrane thickness (thickness) of the second metal layer B3 formed of aluminum is sufficiently large, the anti-oxidization layer 4 may be omitted.

(3) In the foregoing embodiment, detailed explanation was made on the case of forming the first metal layer B1 and the second metal layer B3 of silver. However, the membrane thickness (thickness) in the case of forming the first metal layer B1 and the second metal layer B3 of a silver alloy may be about same as the membrane thickness (thickness) of the case of forming the first metal layer B1 and the second metal layer B3 of silver.

(4) In the foregoing embodiment, detailed explanation was made on the case of forming the second metal layer B3 of aluminum. However, the membrane thickness (thickness) in the case of forming the second metal layer B3 of an aluminum alloy may be about same as the membrane thickness (thickness) of the case of forming the second metal layer B3 of aluminum.

(5) In the foregoing embodiment, there was explained the arrangement in which the radiative surface H of the infrared radiative layer A is formed as a flat surface. However, as shown in FIG. 32, the radiative surface H of the infrared radiative layer A may be formed with unevenness for light diffusion.

Such unevenness for light diffusion can be provided by e.g. embossing work, and in case the infrared radiative layer A is constituted of glass (white glass), such unevenness can be formed by frosted glass work.

Figure 32:
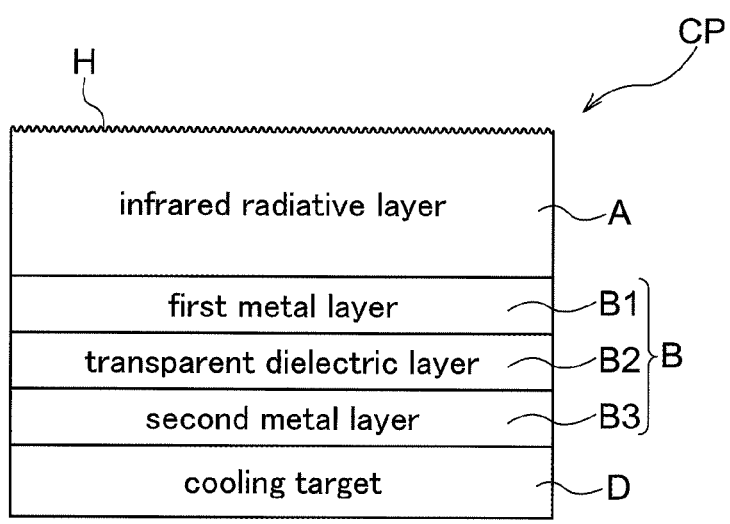
FIG. 32 is a view showing a radiative cooling device of a further embodiment.

Incidentally, FIG. 32 shows such unevenness for light diffusion with exaggeration over the reality.

Incidentally, the arrangements disclosed in the foregoing embodiment (including the other embodiments, same hereinafter) may be used in any combination with the arrangement(s) disclosed in the other embodiments as long as no contradiction results from such combination. Further, the embodiments disclosed in this detailed disclosure are only exemplary, and embodiments of the present invention are not limited thereto, but various changes and modifications will be possible in a range not deviating from the object of the present invention.

DESCRIPTION OF SINGS

3: gapless contact layer
4: anti-oxidization layer
A: infrared radiative layer
B: light reflective layer
B1: first metal layer
B2: transparent dielectric layer
B3: second metal layer

The invention claimed is:

1. A radiative cooling device configured such that an infrared radiative layer for radiating infrared light from a radiative surface and a light reflective layer disposed on the side opposite to the presence side of the radiative surface of the infrared radiative layer are provided in a mutually stacked state:
   wherein the light reflective layer is arranged such that a first metal layer made of silver or silver alloy and having a thickness equal to or greater than 10 nm and equal to or less than 100 nm, a transparent dielectric layer and a second metal layer for reflecting light transmitted through the first metal layer and the transparent dielectric layer are stacked in this order on the side closer to the infrared radiative layer; and
   wherein the transparent dielectric layer has a thickness that causes a resonance wavelength of the light reflective layer to be a wavelength included in wavelengths equal to or greater than 400 nm and equal to or less than 800 nm.

2. The radiative cooling device of claim 1, wherein the second metal layer is formed of silver or silver alloy having a thickness equal to or greater than 100 nm.

3. The radiative cooling device of claim 1, wherein the second metal layer is formed of aluminum or aluminum alloy having a thickness equal to or greater than 30 nm.

4. The radiative cooling device of claim 1, wherein the second metal layer comprises the first layer formed of silver or silver alloy and the second layer formed of aluminum or aluminum alloy stacked and disposed in this order to the side closer to the transparent dielectric layer.

5. The radiative cooling device of claim 1, wherein the transparent dielectric layer comprises a transparent nitride membrane.

6. The radiative cooling device of claim 1, wherein the transparent dielectric layer comprises a transparent oxide layer.

7. The radiative cooling device of claim 1, wherein the infrared radiative layer comprises glass selected from the group consisting of alkali free glass, crown glass and borosilicate glass.

8. The radiative cooling device of claim 1, wherein the infrared radiative layer is used as a substrate, on which the first metal layer, the transparent dielectric layer and the second metal layer are stacked.

9. The radiative cooling device of claim 8, wherein a gapless contact layer is stacked between the infrared radiative layer and the first metal layer.

10. The radiative cooling device of claim 8, wherein on the side of the second metal layer opposite to the presence side of the transparent dielectric layer, an anti-oxidization layer is stacked.

11. The radiative cooling device of claim 1, wherein the radiative surface of the infrared radiative layer has unevenness for light diffusion.

* * * * *